United States Patent
Kanamarlapudi et al.

(10) Patent No.: US 9,462,592 B2
(45) Date of Patent: Oct. 4, 2016

(54) ENHANCEMENTS FOR TRANSMISSION OVER MULTIPLE CARRIERS

(71) Applicant: QUALCOMM Incorporated, San Diego, CA (US)

(72) Inventors: Sitaramanjaneyulu Kanamarlapudi, San Diego, CA (US); Arvindhan Kumar, San Diego, CA (US); Luna Sapna D'Souza, San Diego, CA (US); Chetan Gopalakrishnan Chakravarthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/192,549

(22) Filed: Feb. 27, 2014

(65) Prior Publication Data
US 2015/0043441 A1   Feb. 12, 2015

Related U.S. Application Data

(60) Provisional application No. 61/863,146, filed on Aug. 7, 2013.

(51) Int. Cl.
*H04W 4/00* (2009.01)
*H04W 72/04* (2009.01)

(52) U.S. Cl.
CPC ..... *H04W 72/0486* (2013.01); *H04W 72/0453* (2013.01)

(58) Field of Classification Search
CPC combination set(s) only.
See application file for complete search history.

(56) References Cited

U.S. PATENT DOCUMENTS 8,761,113 B2 * 6/2014 Zhang et al. .............. 370/329

2010/0113004 A1 * 5/2010 Cave et al. ................ 455/422.1
(Continued)

FOREIGN PATENT DOCUMENTS

EP   2197235 A2   6/2010
EP   2373081 A1   10/2011

OTHER PUBLICATIONS

Alcatel-Lucent et al., "MAC and PHY modifications required for dual connectivity support", 3GPP Draft; R2-131964 , 3rd Generation Partnership Project (3GPP), Mobile Competence Centre; 650, Route Des Lucioles ; F-06921 Sophia-Antipolis Cedex; France vol. RAN WG2, No. Fukuoka, Japan; 20130520-20130524 May 11, 2013, XP050700105, pp. 1-4.
(Continued)

*Primary Examiner* — Frank Duong
(74) *Attorney, Agent, or Firm* — Loza & Loza LLP

(57) ABSTRACT

Data is selectively transmitted over one or more carriers of a set of carriers. According to some aspects of the disclosure, a decision may be made to forgo the transmission of a preamble via one of the carriers (e.g., channels). For example, in a multi-carrier system, transmission of a preamble via one carrier may be inhibited if all of the data can be transmitted via another carrier. According to some aspects of the disclosure, a decision may be made to transmit different types of data on a single carrier rather than on multiple carriers. For example, a single carrier may be used to transmit schedule data and non-scheduled data if all of the data can be transmitted on one of the carriers (e.g., during a single transmission time interval). In this case, transmission of a preamble on another one of the carriers may therefore be inhibited.

28 Claims, 13 Drawing Sheets

(56) References Cited

U.S. PATENT DOCUMENTS

| | | |
|---|---|---|
| 2010/0150082 A1* | 6/2010 | Shin et al. .................. 370/329 |
| 2011/0103328 A1 | 5/2011 | Lee et al. |
| 2012/0218904 A1 | 8/2012 | Narasimha et al. |
| 2013/0010659 A1 | 1/2013 | Chen et al. |
| 2013/0155984 A1 | 6/2013 | Marinier et al. |
| 2013/0308589 A1 | 11/2013 | Liu et al. |
| 2013/0326551 A1 | 12/2013 | Chatterjee et al. |
| 2014/0192694 A1* | 7/2014 | Pantelidou .................. 370/311 |

OTHER PUBLICATIONS

International Search Report and Written Opinion—PCT/US2014/049561—ISA/EPO—Oct. 29, 2014.

* cited by examiner

ENHANCEMENTS FOR TRANSMISSION OVER MULTIPLE CARRIERS

CROSS-REFERENCE TO RELATED APPLICATIONS

This application claims priority to and the benefit of provisional patent application No. 61/863,146 filed in the U.S. patent office on Aug. 7, 2013, the entire content of which is incorporated herein by reference.

BACKGROUND

1. Field

Aspects of the disclosure relate generally to wireless communication and more particularly, but not specifically, to transmission over multiple carriers.

2. Background

Wireless communication networks are widely deployed to provide various communication services such as telephony, video, data, messaging, broadcasts, and so on. Such networks, which are usually multiple access networks, support communication for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communication (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communication protocols, such as High Speed Packet Access (HSPA), which provides higher data transfer speeds and capacity to associated UMTS networks.

The efficiency with which wireless resources are used is an important consideration in wireless communication. For example, it is desirable to reduce the amount of radio frequency (RF) interference present in a wireless resource to improve the quality of communication experienced by users of the wireless resource. Also, it is desirable to reduce the amount of power consumed by a mobile device to improve the battery life of the mobile device.

Accordingly, as the demand for mobile broadband access continues to increase, research and development continue to advance the UMTS technologies not only to meet the growing demand for mobile broadband access, but to advance and enhance the user experience with mobile communication.

SUMMARY

The following presents a simplified summary of some aspects of the disclosure in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

Various aspects of the disclosure provide for conditionally determining whether to transmit a preamble on a carrier (e.g., a channel). For example, in a multi-carrier system where data may be transmitted on multiple carriers, transmission of a preamble on one carrier may be inhibited if all of the data can be transmitted on another carrier.

Various aspects of the disclosure provide for the utilization of continuous packet connectivity (CPC) in combination with dual-carrier high-speed uplink packet access (DC-HSUPA). For example, the transmission of preambles by a user equipment (UE) operating in CPC mode for DC-HSUPA can be regulated to improve resource utilization. In some particular aspects, the preamble is largely restricted to being transmitted on the primary uplink carrier if a determined quantity of bits for an uplink transmission is less than a buffer occupancy for scheduled flow data. Here, the quantity of bits determined for the uplink transmission correspond to a selected EUL transport format combination (E-TFC) having the closest number of bits just below a total number of allowed bits. This total number of allowed bits, in turn, corresponds to the lesser of the quantity of bits granted to the UE for transmission, or the quantity of bits supported by the available UE transmit power.

Various aspects of the disclosure also provide for conditionally determining whether to transmit all data on a single carrier in a multi-carrier system. For example, a single carrier may be used if all of the data can be transmitted on one of the carriers. In this case, transmission of a preamble on another one of the carriers may be inhibited.

In one aspect, the disclosure provides a method for wireless communication including determining a first quantity of data to be transmitted via at least one of a first carrier or a second carrier; determining a second quantity of data allowed to be transmitted via the second carrier; determining whether the first quantity exceeds the second quantity; and determining whether to transmit a preamble via the first carrier based on the determination of whether the first quantity exceeds the second quantity.

Another aspect of the disclosure provides an apparatus configured for wireless communication that includes at least one processing circuit, a memory coupled to the at least one processing circuit, and a communication interface coupled to the at least one processing circuit. The at least one processing circuit is configured to determine a first quantity of data to be transmitted via at least one of a first carrier or a second carrier; determine a second quantity of data allowed to be transmitted via the second carrier; determine whether the first quantity exceeds the second quantity; and determine whether to transmit a preamble via the first carrier based on the determination of whether the first quantity exceeds the second quantity.

Another aspect of the disclosure provides an apparatus configured for wireless communication. The apparatus including means for determining a first quantity of data to be transmitted via at least one of a first carrier or a second carrier; means for determining a second quantity of data allowed to be transmitted via the second carrier; means for determining whether the first quantity exceeds the second quantity; and means for determining whether to transmit a preamble via the first carrier based on the determination of whether the first quantity exceeds the second quantity.

Another aspect of the disclosure provides an article of manufacture including a computer-readable medium having programming for causing a computer to determine a first quantity of data to be transmitted via at least one of a first carrier or a second carrier; determine a second quantity of data allowed to be transmitted via the second carrier; determine whether the first quantity exceeds the second quantity; and determine whether to transmit a preamble via the first carrier based on the determination of whether the first quantity exceeds the second quantity.

Another aspect of the disclosure provides a method for wireless communication including determining a first quantity of scheduled flow data to be transmitted; determining a second quantity of non-scheduled flow data to be transmitted; calculating a sum of the first quantity and the second quantity; transmitting the scheduled flow data and the non-scheduled flow data via a first carrier if the sum is less than or equal to a threshold; and forgoing transmission of a preamble via a second carrier if the sum is less than or equal to the threshold.

Another aspect of the disclosure provides an apparatus configured for wireless communication that includes at least one processing circuit, a memory coupled to the at least one processing circuit, and a communication interface coupled to the at least one processing circuit. The at least one processing circuit is configured to determine a first quantity of scheduled flow data to be transmitted; determine a second quantity of non-scheduled flow data to be transmitted; calculate a sum of the first quantity and the second quantity; transmit the scheduled flow data and the non-scheduled flow data via a first carrier if the sum is less than or equal to a threshold; and forgo transmission of a preamble via a second carrier if the sum is less than or equal to the threshold.

Another aspect of the disclosure provides an apparatus configured for wireless communication. The apparatus including means for determining a first quantity of scheduled flow data to be transmitted; means for determining a second quantity of non-scheduled flow data to be transmitted; means for calculating a sum of the first quantity and the second quantity; means for transmitting the scheduled flow data and the non-scheduled flow data via a first carrier if the sum is less than or equal to a threshold; and means for forgoing transmission of a preamble via a second carrier if the sum is less than or equal to the threshold.

Another aspect of the disclosure provides an article of manufacture including a computer-readable medium having programming for causing a computer to determine a first quantity of scheduled flow data to be transmitted; determine a second quantity of non-scheduled flow data to be transmitted; calculate a sum of the first quantity and the second quantity; transmit the scheduled flow data and the non-scheduled flow data via a first carrier if the sum is less than or equal to a threshold; and forgo transmission of a preamble via a second carrier if the sum is less than or equal to the threshold.

These and other aspects of the disclosure will become more fully understood upon a review of the detailed description, which follows. Other aspects, features, and implementations of the disclosure will become apparent to those of ordinary skill in the art, upon reviewing the following description of specific, implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
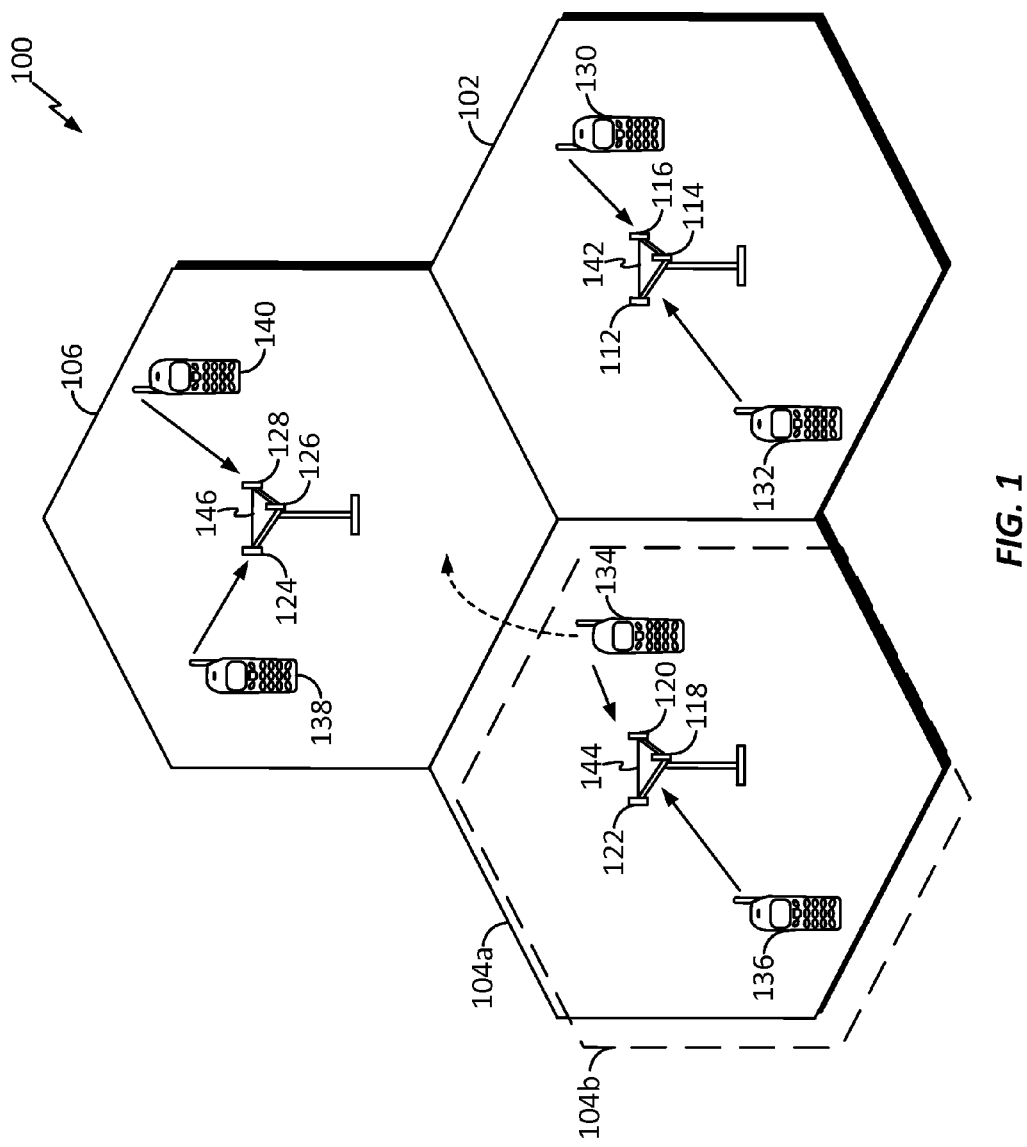
FIG. 1 is a conceptual diagram illustrating an example of an access network in which one or more aspects of the disclosure may find application.

The various concepts presented throughout this disclosure may be implemented across a broad variety of communication systems, network architectures, and communication standards. Referring to FIG. 1, by way of example and without limitation, a simplified access network 100 in a UMTS Terrestrial Radio Access Network (UTRAN) architecture, which may utilize High-Speed Packet Access (HSPA), is illustrated. The system includes multiple cellular regions (cells), including cells 102, 104, and 106, each of which may include one or more sectors. Cells may be defined geographically, e.g., by coverage area, and/or may be defined in accordance with a frequency, scrambling code, etc. That is, the illustrated geographically-defined cells 102, 104, and 106 may each be further divided into a plurality of cells, e.g., by utilizing different frequencies or scrambling codes. For example, a cell 104a may utilize a first frequency or scrambling code, and a cell 104b, while in the same geographic region and served by the same Node B 144, may be distinguished by utilizing a second frequency or scrambling code.

In a cell that is divided into sectors, the multiple sectors within a cell can be formed by groups of antennas with each antenna responsible for communication with UEs in a portion of the cell. For example, in the cell 102, antenna groups 112, 114, and 116 may each correspond to a different sector. In the cell 104, antenna groups 118, 120, and 122 each correspond to a different sector. In the cell 106, antenna groups 124, 126, and 128 each correspond to a different sector.

The cells 102, 104 and 106 may include several UEs that may be in communication with one or more sectors of each cell 102, 104 or 106. For example, the UEs 130 and 132 may be in communication with the Node B 142, the UEs 134 and 136 may be in communication with the Node B 144, and the UEs 138 and 140 may be in communication with the Node B 146. Here, each Node B 142, 144, 146 is configured to provide an access point to a core network 204 (see FIG. 2) for all the UEs 130, 132, 134, 136, 138, 140 in the respective cells 102, 104, and 106.

Figure 2:
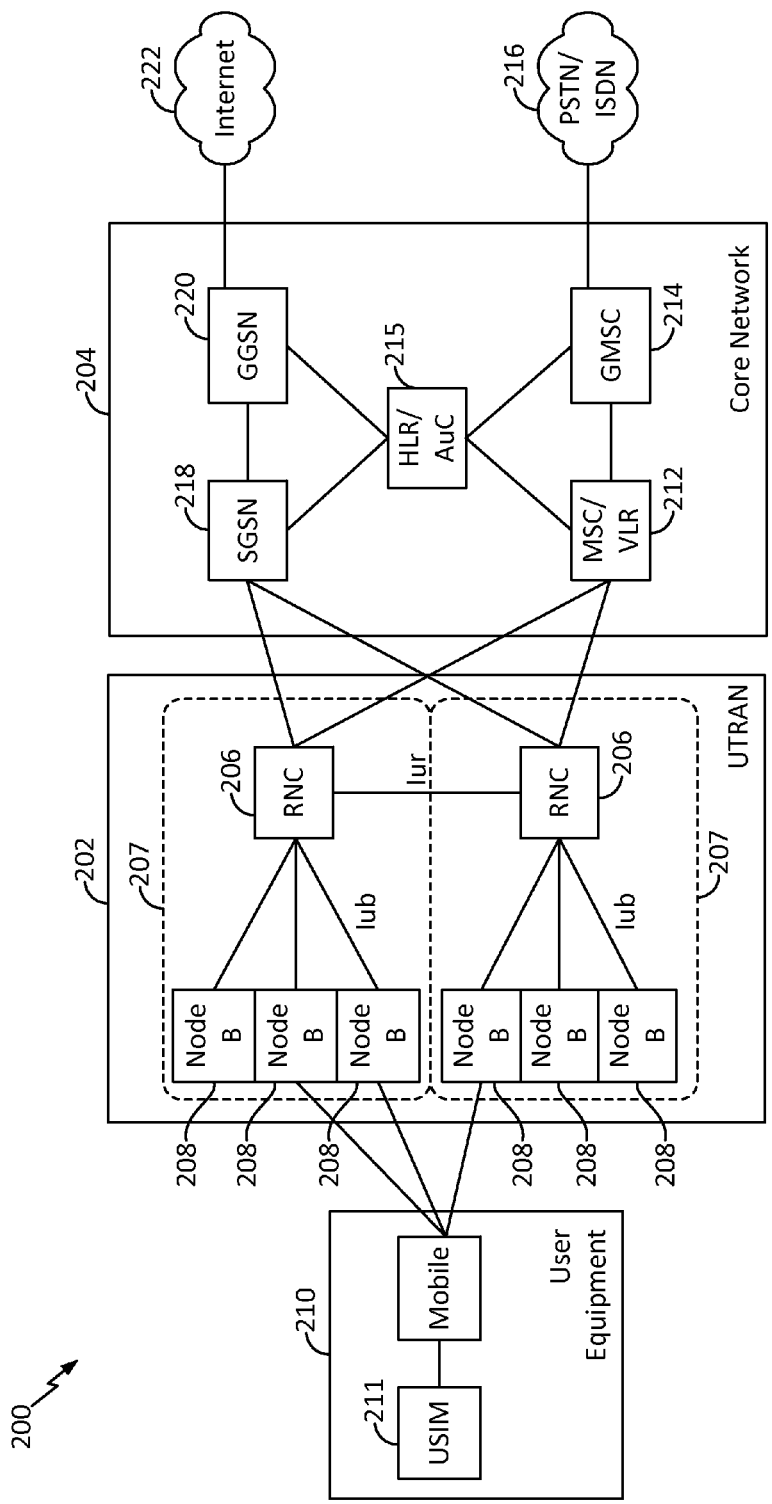
FIG. 2 is a block diagram conceptually illustrating an example of a communication system in which one or more aspects of the disclosure may find application.

Referring now to FIG. 2, by way of example and without limitation, various aspects of the disclosure are illustrated with reference to a Universal Mobile Telecommunications System (UMTS) system 200 employing a wideband code division multiple access (W-CDMA) air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as the illustrated RNSs 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudo-random bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
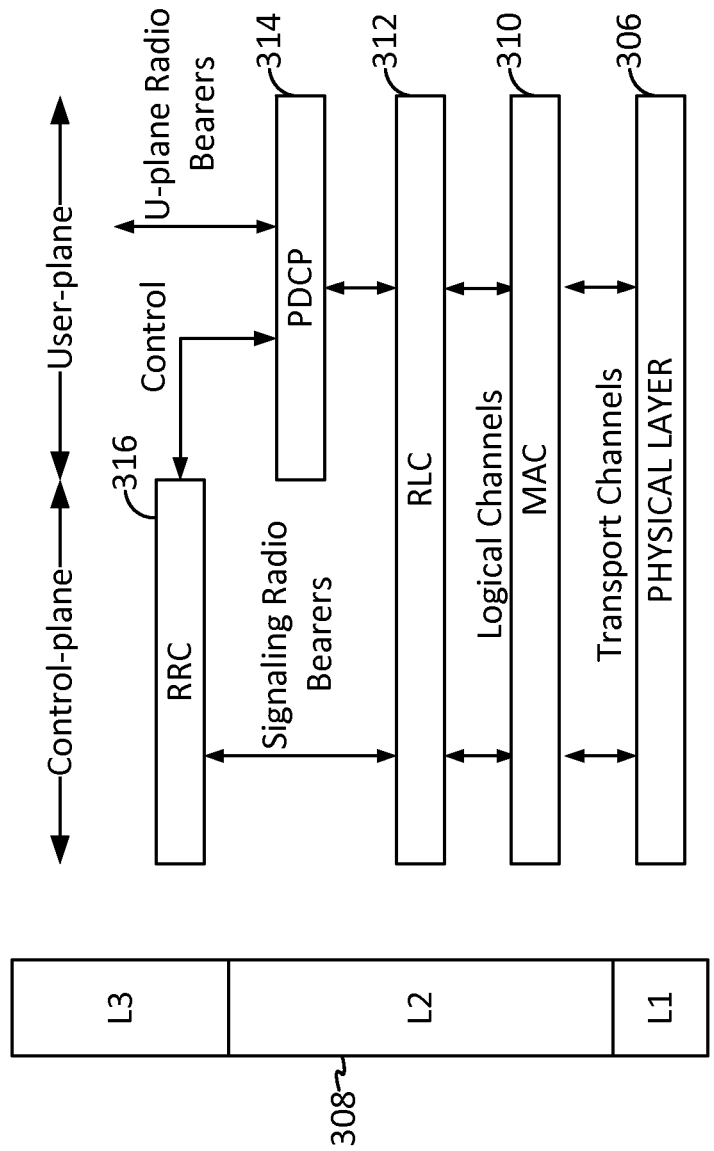
FIG. 3 is a conceptual diagram illustrating an example of a radio protocol architecture for a user plane and a control plane.

In a wireless communication system, the radio protocol architecture between a mobile device and a cellular network may take on various forms depending on the particular application. An example for a 3GPP high-speed packet access (HSPA) system will now be presented with reference to FIG. 3, illustrating an example of the radio protocol architecture for the user and control planes between the UE 210 and the Node B 208. Here, the user plane or data plane carries user traffic, while the control plane carries control information, i.e., signaling.

Turning to FIG. 3, the radio protocol architecture for the UE 210 and Node B 208 is shown with three layers: Layer 1, Layer 2, and Layer 3. Although not shown, the UE 210 may have several upper layers above the L3 layer including a network layer (e.g., IP layer) that is terminated at a PDN gateway on the network side, and an application layer that is terminated at the other end of the connection (e.g., far end UE, server, etc.).

At Layer 3, the RRC layer 316 handles control plane signaling between the UE 210 and the Node B 208. RRC layer 316 includes a number of functional entities for routing higher layer messages, handling broadcast and paging functions, establishing and configuring radio bearers, etc.

The data link layer, called Layer 2 (L2 layer) 308 is between Layer 3 and the physical layer 306, and is responsible for the link between the UE 210 and Node B 208. In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Of course, those of ordinary skill in the art will comprehend that additional or different sublayers may be utilized in a particular implementation of the L2 layer 308, still within the scope of the disclosure.

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical channels and transport channels. The MAC sublayer 310 is also responsible for allocating the various radio resources (e.g., resource blocks) in one cell among the UEs. The MAC sublayer 310 is also responsible for HARQ operations.

Layer 1 is the lowest layer and implements various physical layer signal processing functions. Layer 1 will be referred to herein as the physical layer (PHY) 306. At the PHY layer 306, the transport channels are mapped to different physical channels.

Data generated at higher layers, all the way down to the MAC layer 310, are carried over the air through transport channels. 3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

DC-HSUPA

3GPP Release 9 specifications included a dual-carrier (or dual-cell) version of HSUPA, which may be referred to as DC-HSUPA. DC-HSUPA provides for an E-DCH to be transmitted on each of a primary carrier and a secondary carrier. That is, in various aspects of the disclosure, the carrier corresponding to a primary transceiver chain may be referred to as a primary carrier, and the carrier corresponding to a secondary transceiver chain may be referred to as a secondary carrier.

In DC-HSUPA, a scheduler at the Node B 208 may provide scheduling information to the UE 210 for transmission of scheduled flow data for each uplink carrier. This scheduling information provided to the UE 210 may be utilized to schedule resources for the UE to use in its uplink transmission. The scheduling of a UE 210 may be made in accordance with various measurements made by the Node B 208 such as the noise level at the Node B receiver, with various feedback information transmitted on the uplink by UEs such as a "happy bit," buffer status, and transmission power availability, and with priorities or other control information provided by the network. That is, the scheduler at the Node B 208 may generate and transmit two grants, e.g., one for each carrier during each transmission time interval (TTI).

For example, the E-AGCH is a physical channel that may be utilized to carry information from the Node B 208 to the UE 210 for controlling the power and transmission rate of uplink transmissions by the UE 210 on the E-DCH. Further scheduling information may also be conveyed from the Node B 208 to the UE 210 over the E-RGCH. Here, the E-RGCH may be utilized for small adjustments during ongoing data transmissions.

The grant provided on the E-AGCH can change over time for a particular UE, so grants may be periodically or intermittently transmitted by the Node B 208. The absolute grant value carried on the E-AGCH may indicate the maximum E-DCH traffic to pilot power ratio (T/P) that the UE 210 is allowed to use in its next transmission.

The scheduling grant provided on the E-AGCH may be used by the UE 210 to determine at least the transport block size (TBS) for the primary and secondary carriers to be transmitted in the next uplink transmission, as well as the transmit power on the E-DPDCH(s). The TBS is the size of a block of information transmitted on a transport channel (e.g., the E-DCH) during a TTI.

A further characteristic of DC-HSUPA is that during the E-TFC selection procedure, when building protocol data units (PDUs) for transmission of scheduled data, the secondary carrier is considered before the primary carrier. That is, if the secondary carrier has available power, and has received a grant for scheduled data, then any scheduled data that the UE has ready for transmission is first allocated to the secondary carrier, and afterward, remaining scheduled data is allocated to the primary carrier.

Further, with the publication of DC-HSUPA specifications, a "pre-allocation" of power for non-scheduled data was introduced. Here, a non-scheduled flow relates to guaranteed data that the UE may send essentially whenever that data is ready to send. In DC-HSUPA, non-scheduled data is limited to transmissions on the primary uplink carrier only.

Unlike scheduled data, non-scheduled data need not be scheduled by the network on a TTI basis by utilizing channels such as the E-AGCH or E-RCGH. Rather, the amount of non-scheduled data that may be transmitted by the UE is pre-configured utilizing a more permanent grant by the RNC, which is not influenced by the scheduler at the Node B.

Some data that typically utilizes a non-scheduled flow may include Signaling Radio Bearer (SRB), or voice-over-IP (VoIP) data. These types of data generally have limited tolerance for delay or low data rates, and thus, scheduling these types of data in scheduled flows might result in degradation of the user experience.

CPC

Continuous packet connectivity (CPC) is the name used in standards for HSPA for certain features that can enable power savings and extend talk time, as well as increase voice call capacity in a network. For example, CPC includes a discontinuous transmission (DTX) feature and a discontinuous receiving (DRX) feature. DTX is a feature where the UE may cut off uplink transmissions at certain times, allowing the transmitter (TX) to completely shut down. Similarly, DRX is a feature where the UE may shut off its receiver (RX) to save power, waking up at regular intervals to monitor for broadcast messages, such as listening to the paging channel for a paging message.

Uplink DTX is defined with two different cycles. Cycle 1 (UE_DTX_cycle_1) is a "normal" cycle, with usual periods of activity and inactivity, while Cycle 2 (UE_DTX_cycle_2) utilizes longer periods of inactivity. The UE generally moves from Cycle 1 to Cycle 2 after a certain configurable period of inactivity on the E-DCH.

When utilizing CPC for a high-speed uplink transmission (e.g., utilizing EUL), the UE generally starts transmitting one or more preambles a few slots ahead of an actual data transmission on the E-DCH. Here, the number of slots used for the preamble generally depends on whether the UE is operating in DTX Cycle 1 or 2, and further depends on certain configuration parameters corresponding to long preamble length slots, etc., from the network.

The 3GPP standard TS 25.214 titled "Physical layer procedures (FDD)" (incorporated herein by reference), and in particular sub clause 6C.2.2.2 of that standard titled "Uplink DPCCH preamble and postamble for the E-DCH transmission," describes the short preamble and the long preamble. Subclause 6C.2.2.2 of version 11.6.0 (June 2013) of this standard states as follows: "If a UE will start a transmission of E-DPCCH and E-DPDCH on a E-DCH TTI, the UE shall start the DPCCH transmission 2 slots prior to the E-DCH TTI and continue the DPCCH transmission during the E-DCH TTI and consecutive E-DCH TTIs and 1 slot after the last consecutive E-DCH TTI. In addition, if there has not been any E-DCH transmission for the last Inactivity_Threshold_for_UE_DTX_cycle_2 E-DCH TTIs, and if a UE will start a transmission of E-DPCCH and E-DPDCH on a E-DCH TTI, the UE shall start the DPCCH transmission UE_DTX_long_preamble_length slots prior to the E-DCH TTI and continue the DPCCH transmission during the E-DCH TTI and consecutive E-DCH TTIs and 1 slot after the last consecutive E-DCH TTI."

When CPC is utilized together with DC-HSUPA, the requirements for the preamble transmission, described above, when combined with the requirements for the E-TFC selection procedure for DC-HSUPA, can result in an anomalous transmission of a preamble on the primary carrier, even when no data is to be transmitted on the primary carrier.

That is, when there is data in the MAC layer for uplink transmission, the UE may begin the above-described preamble transmission on both carriers (e.g., the primary carrier and the secondary carrier), followed by the uplink data transmission utilizing the E-DCH on both carriers. For example, in a typical scenario where there is data for transmission in a scheduled flow as well as data for transmission in a non-scheduled flow, assuming that there is available power on both carriers and that the secondary carrier has received a grant for transmitting scheduled data, then following the transmission of the preamble on both carriers, the non-scheduled flow would be carried on the primary carrier and at least a part of the scheduled flow would be carried on the secondary carrier. However, the scenario may change if there is only data on either a non-scheduled flow, or only on a scheduled flow.

If the MAC layer only has data which belongs to a non-scheduled flow, the UE can start preambles only on the primary carrier, forgoing to transmit any preambles on the secondary carrier, and there is no ambiguity. That is, because non-scheduled data is limited only to be carried on the primary carrier, and in this scenario there is no scheduled data, then the secondary carrier will not carry any data for transmission. However, if the MAC layer only has data that belongs to a scheduled flow, the UE may start preambles on both the primary carrier and the secondary carrier.

That is, at the time when the UE makes the determination whether to start transmitting the preambles on the respective carriers, the UE generally does not consider whether data will be transmitted on each carrier. However, during the actual E-DCH frame transmission, after EUL transport format combination indicator (E-TFCI) selection, as per the DC-HSUPA requirements, the data might be fully consumed on the secondary carrier itself, leaving the primary carrier without any data to send.

Thus, as described above, in some scenarios the UE may transmit an unneeded preamble on the primary carrier, even though no data follows the preamble. When this unneeded preamble is transmitted a majority of the time, it may result in degraded power performance at the UE, due to wasted preamble power on the primary carrier. Further, it may result in degraded resource utilization on the network side in anticipation of the data on the primary carrier. Still further, it may result in unwanted noise being added to the overall radio environment, due to unwanted preambles being transmitted.

Selective Preamble Transmission

The disclosure relates in some aspects to forgoing the transmission of a preamble under certain circumstances. For example, when a UE is operating in DC-HSUPA along with CPC mode, the UE may enhance the E-TFC selection algorithm by forgoing preamble transmission on the primary carrier when no data would follow the preamble on the primary carrier. In this way, the transmission of unwanted preambles may be avoided at least to some extent.

Figure 4:
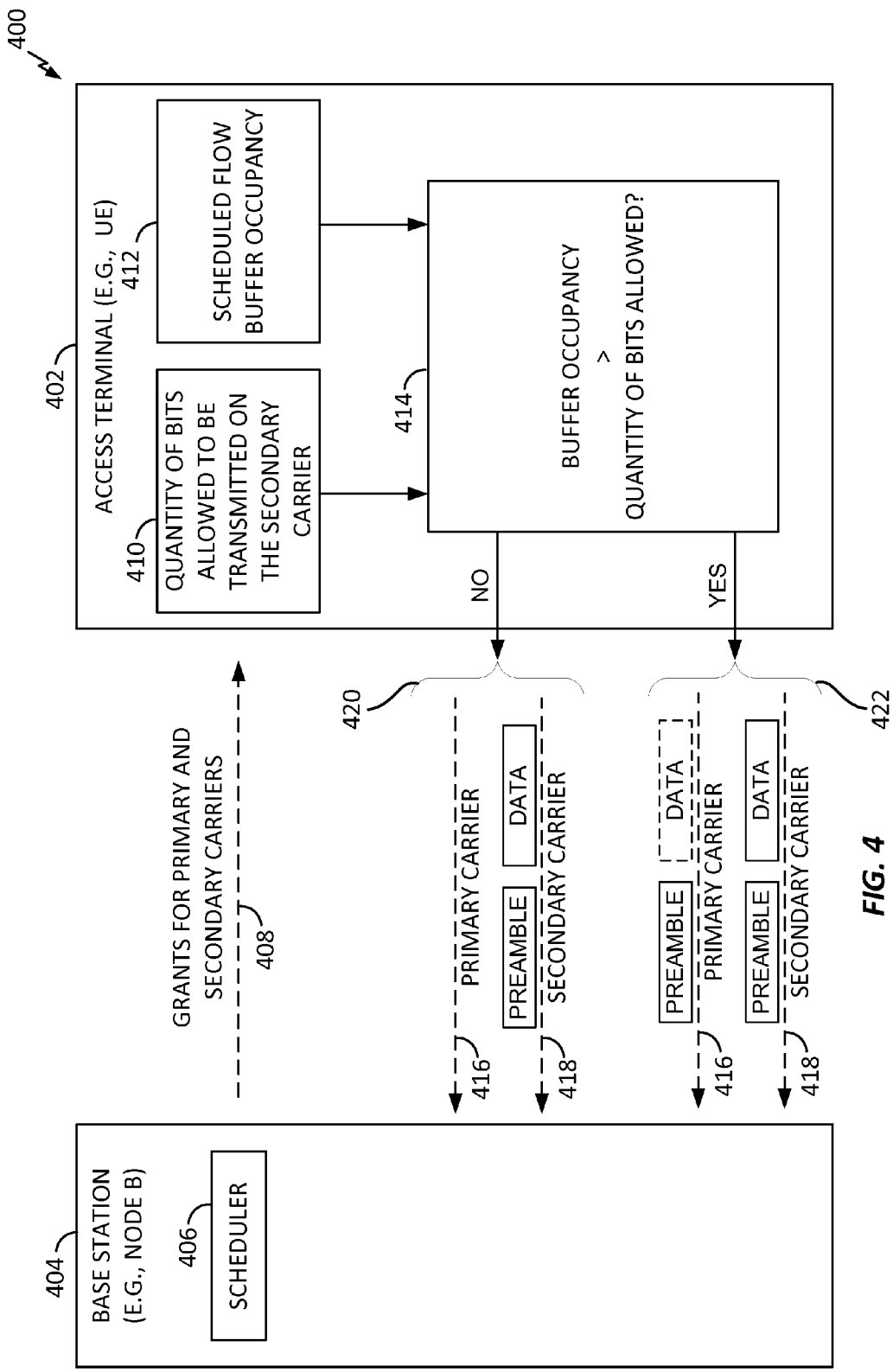
FIG. 4 is a block diagram conceptually illustrating an example of a communication system where transmission of a preamble can be selectively inhibited in accordance with some aspects of the disclosure.

FIG. 4 illustrates an example of a system 400 where an access terminal 402 (e.g., a UE) in communication with a base station 404 (e.g., a Node B) selectively determines whether to transmit a preamble on a carrier. For example, the access terminal 402 can regulate the transmission of preambles in CPC mode for DC-HSUPA.

A scheduler 406 at the base station 404 sends grants to the access terminal via downlink signaling 408. Each grant can indicate, for example, the number of bits that the access terminal 402 is allowed to transmit on a given carrier during a given TTI. As discussed in more detail below in conjunction with FIG. 6, based at least in part on a received grant, the access terminal 402 can determine the quantity of bits allowed to be transmitted on the secondary carrier 410 (e.g., during a given TTI).

Also as discussed below, the access terminal 402 can determine its scheduled flow buffer occupancy 412. For example, the scheduled flow buffer occupancy 412 may indicate the number of bits of scheduled data to be transmitted during a given TTI.

At block 414 the scheduled flow buffer occupancy 412 is compared with the quantity of bits allowed to be transmitted on the secondary carrier 410. If the buffer occupancy is not greater than the quantity of bits allowed, the access terminal 402 regulates transmission over the primary carrier 416 and the secondary carrier 418 as indicated by a bracket 420. In contrast, if the buffer occupancy is greater than the quantity of bits allowed, the access terminal 402 regulates transmission over the primary carrier 416 and the secondary carrier 418 as indicated by a bracket 422.

At bracket 420, the secondary carrier can transmit all the bits of scheduled data. Because scheduled data is first allocated to the secondary carrier (as described above), no scheduled data is allocated to the primary carrier. Thus, given that there is no non-scheduled data to be carried on the primary carrier, the primary carrier is unused and, accordingly, a preamble is not needed on the primary carrier. Thus, if the access terminal 402 determines that the actual number of bits allowed on the secondary carrier is not less than a given threshold (e.g., the scheduled flow buffer occupancy), then the access terminal 402 may forgo transmission of a preamble on the primary carrier as shown in FIG. 4 at bracket 420.

Conversely, at bracket 422, the secondary carrier is not able to transmit all the bits of scheduled data since there are more bits in the scheduled flow buffer occupancy than the secondary carrier is allowed to transmit (e.g., in a given TTI). In this case, preambles are sent on the primary carrier 416 and the secondary carrier 418 followed by the corresponding data transmissions according to CPC. Thus, the preamble on the primary uplink carrier may be restricted to being transmitted only if a determined number of bits for an uplink transmission on the secondary carrier is less than a buffer occupancy for scheduled flow data.

Through the use of the above scheme, in the instance that there is no non-scheduled data to transmit, the access terminal 402 will preferably start the preambles on the primary carrier "only" when there is an amount of scheduled data beyond the actual number of bits allowed on the secondary carrier. In practice, the access terminal 402 might not be able to ensure that preambles are never sent on the primary carrier when data is not sent on the primary carrier. Thus, the term "only" as used above is not necessarily absolute. For example, when an ACK is received for a scheduled data packet that is about to be transmitted on the primary carrier, it may sometimes be possible for the preamble to be transmitted on the primary carrier even though data will not in fact be transmitted on the primary carrier. Such a data transmission might not occur, for example, because the network may have changed the grant after the transmission of the preamble has commenced, the data may no longer need to be transmitted, or the data may no longer be available. However, by utilizing aspects of the disclosure as described herein, these cases are rare, and in most instances, the preamble(s) would be transmitted on the primary carrier only when data follows on that primary carrier.

With such an enhancement, radio resources may be utilized in a more optimal manner, and further, power performance at the UE may be improved. Moreover, this solution can be implemented in a UE without affecting network operations. Consequently, this enhancement may be implemented without changing any of the standards detailing communication between a UE and the network.

Data Allocation Among Carriers

The disclosure also relates in some aspects to modified allocation of data among the primary and secondary carriers in the case wherein there is only a small amount of data (e.g., a number of bits below a suitable threshold number of bits) present on one or both of the scheduled flow and/or the non-scheduled flow. For example, in a conventional UE configured for DC-HSUPA, when also configured for CPC, any small amount of scheduled flow data would be allocated only to the secondary carrier, while any small amount of non-scheduled flow data would be allocated to the primary carrier.

In accordance with an aspect of the disclosure, however, as long as the scheduled and non-scheduled flow data can fit entirely onto the primary carrier (either before or after the power is split between the carriers), the UE may be configured to allocate both the scheduled and non-scheduled flow data entirely onto the primary carrier, without transmitting on the secondary carrier. Moreover, the UE may advantageously forgo transmission of the preamble on the secondary carrier under these circumstances.

In this way, additional power savings may be achieved since some transmissions on the secondary carrier are avoided. For example, the secondary carrier may spend more time in the DTX Cycle 2 mode of operation.

Figure 5:
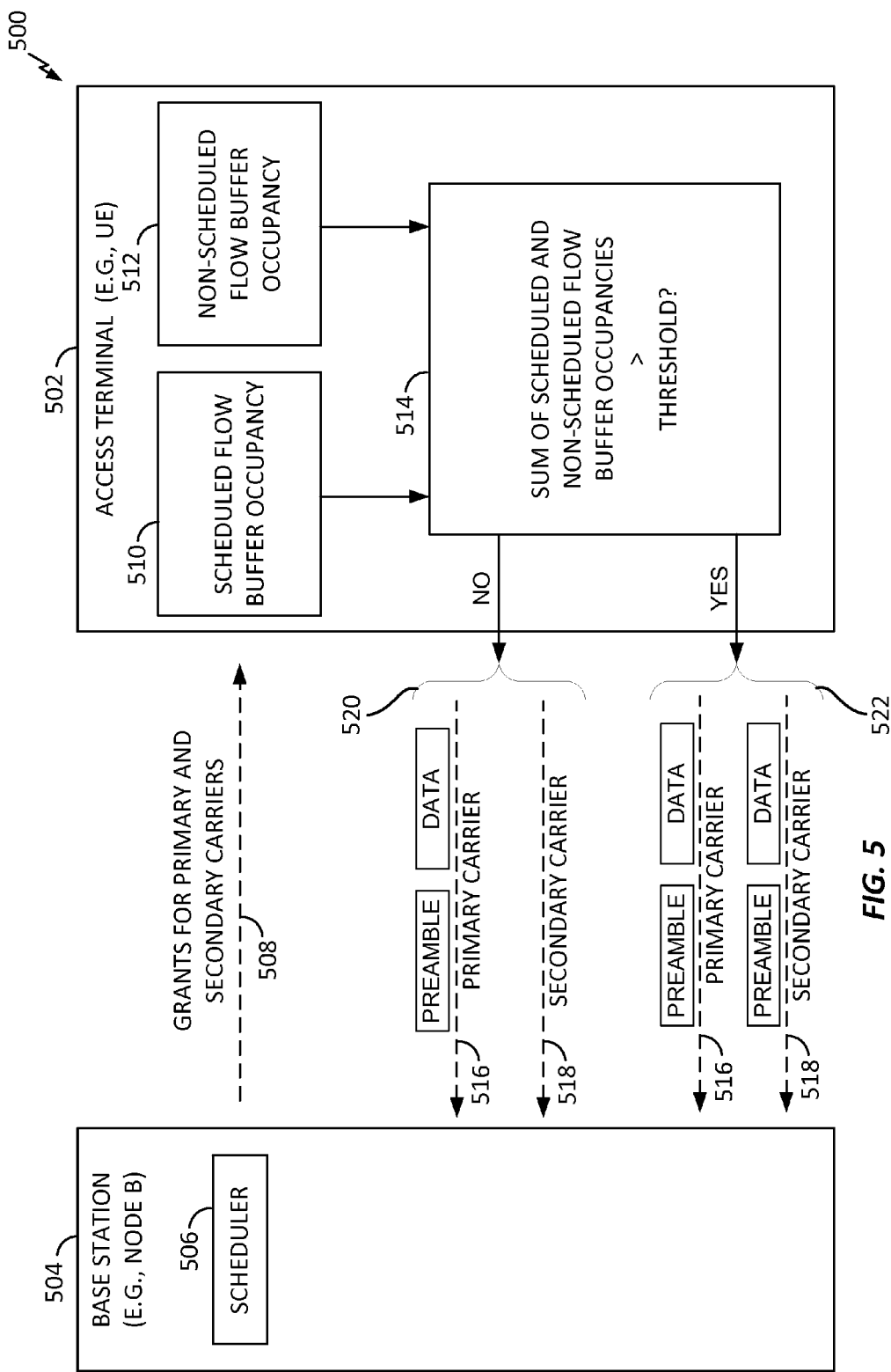
FIG. 5 is a block diagram conceptually illustrating an example of a communication system where a decision can be made to transmit data on a single carrier of a set of multiple carriers in accordance with some aspects of the disclosure.

FIG. 5 illustrates an example of a system 500 where an access terminal 502 (e.g., a UE) in communication with a base station 504 (e.g., a Node B) selectively determines whether scheduled data and non-scheduled data can just be transmitted via the primary carrier. Moreover, based on this determination, the access terminal 502 can regulate the transmission of preambles on the secondary carrier in CPC mode for DC-HSUPA.

A scheduler 506 at the base station 504 sends grants to the access terminal via downlink signaling 508. Each grant can indicate, for example, the number of bits that the access terminal 502 is allowed to transmit on a given carrier during a given TTI. As discussed in more detail below in conjunction with FIG. 6, based at least in part on a received grant, the access terminal 502 can determine the quantity of bits allowed to be transmitted on the primary carrier (e.g., during a given TTI).

Also as discussed below, the access terminal 502 can determine its scheduled flow buffer occupancy 510 and its non-scheduled flow buffer occupancy 512. For example, the scheduled flow buffer occupancy 510 and the non-scheduled flow buffer occupancy 512 may each indicate the number of bits of corresponding data to be transmitted during a given TTI.

At block 514, the sum of the scheduled flow buffer occupancy 512 and the non-scheduled flow buffer occupancy 512 is calculated, and this sum is compared to a threshold. This threshold may correspond to, for example, the quantity of bits allowed to be transmitted on the primary carrier (e.g., during a given TTI).

If the sum is not greater than the threshold, the access terminal 502 transmits the scheduled flow data and the non-scheduled flow data over the primary carrier 516 and the secondary carrier 518 is not used as indicated by a bracket 520. Advantageously, the access terminal 502 may forgo transmitting a preamble over the secondary carrier 518 even if the access terminal 502 is operating in CPC mode.

In contrast, if the sum is greater than the threshold at block 514, the access terminal 502 may transmit data over both the primary carrier 516 and the secondary carrier 518 as indicated by a bracket 522. In particular, any non-scheduled flow data is transmitted via the primary carrier 512, and at least some of the scheduled flow data is transmitted via the secondary carrier 518.

Additional Examples

Figure 6:
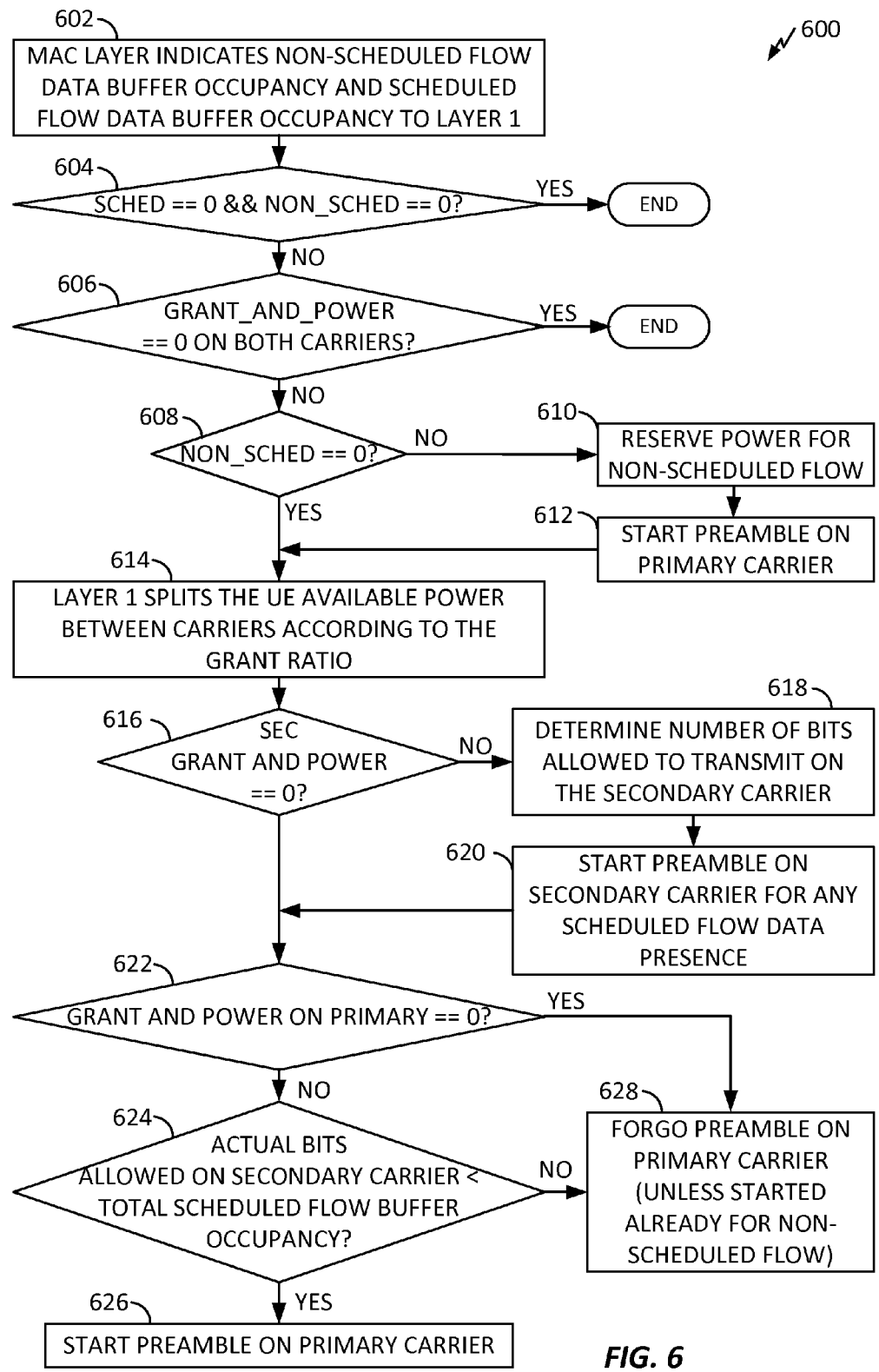
FIG. 6 is a flowchart illustrating an example of a process for determining whether to transmit preambles on primary and secondary carriers in accordance with some aspects of the disclosure.

FIG. 6 illustrates a process 600 for carrying out a portion an E-TFC selection algorithm related to the determination whether to transmit preambles, in accordance with some aspects of the disclosure. The process 600 may take place within a processing circuit 710 (FIG. 7), which may be located at a UE or some other suitable apparatus. In another aspect, the process 600 may be implemented by any of the UEs 130-140 illustrated in FIG. 1. Of course, in various aspects within the scope of the present disclosure, the process 600 may be implemented by any suitable apparatus capable of supporting multi-carrier operations.

At block 602, the MAC layer 310 at a UE may indicate the buffer occupancy for non-scheduled flow data (NS-G_BO), and the buffer occupancy for scheduled flow data (SG_BO) to Layer 1 (306).

At block 604, Layer 1 (306) may determine whether the buffered scheduled and non-scheduled data are equal to zero. That is, the UE may determine if there is data to send. If no, then the process may end. If yes, however, then at block 606, the UE may determine whether a scheduled grant, and a power headroom, are equal to zero on both carriers. Here, if there is no power headroom for a DC-HSUPA transmission, and if the scheduled grant is equal to zero, then the UE may forgo the DC-HSUPA transmission during this TTI, and the process may end.

If the scheduled grant and the power headroom are not both equal to zero for both carriers, at block 608, the UE determines whether the amount of non-scheduled data for transmission (e.g., corresponding to SG_BO) is equal to zero. If nonzero, the process may proceed to block 610, wherein the UE may reserve power for the non-scheduled flow, and at block 612, the UE may start transmission of a suitable preamble on the primary carrier.

On the other hand, if at block 608 the UE determines that there is no non-scheduled data for transmission, this implies that only scheduled data will be transmitted in the next TTI. Thus, at block 614, Layer 1 (306) may split the available power between the primary carrier and the secondary carrier, in accordance with a suitable grant ratio. Specifically, ($P_{total\_power} - P_{non\_sched}$) may be split between the Primary and Secondary carriers as per the grant ratios between the carriers ($P_{secondary\_carrier}$, $P_{primary\_carrier} + P_{non\_sched}$).

Moving on to block 616, the UE may determine whether the scheduled grant and the power headroom for the secondary carrier are equal to zero. If not, then the process may proceed to block 618, wherein the UE may determine the number of bits that it is allowed to transmit on the secondary carrier. For example, the total number of allowed bits on the secondary carrier ($Total_{bits\_allowed}$) may be equal to whichever is less: the number of bits allowed in accordance to a received grant, or the number of bits allowed in accordance with the power to be utilized on the secondary carrier. Here, $Total_{bits\_allowed}$=MIN (Number of bits allowed with Grant, Number of bits allowed with $P_{secondary\_carrier}$).

However, the actual number of bits the UE is allowed to transmit on the secondary carrier may not be equal to the total allowed bits. Rather, the actual number of bits may correspond to the closest E-TFCI that the UE may utilize, with a number of bits just below the total allowed bits. Here, $\text{Actual}_{bits\_allowed}$=Closest E-TFCI just below the $\text{Total}_{bits\_allowed}$ At block 620, the UE may start the preamble on the secondary carrier for any scheduled flow data presence. That is, because, as described above, DC-HSUPA schedules data to the secondary carrier first, if there is any scheduled data, at least a part of it will be transmitted on the secondary carrier, and accordingly, the preamble will be needed on that carrier.

Moving on to block 622, the UE may determine whether the scheduled grant and the power headroom for the primary carrier are equal to zero. If they are equal to zero, then scheduled data will not be carried on the primary carrier during this TTI, so unless a preamble was started at block 612 (above), then the UE would know not to transmit a preamble on the primary carrier. However, if the grant and power on the primary carrier are not equal to zero, then the process may proceed to block 624, wherein the UE may determine whether to transmit the preamble on the primary carrier. That is, at block 624, the UE may determine whether the actual number of bits allowed for transmission on the secondary carrier is less than the buffer occupancy for scheduled flow data (SG_BO). That is, if the secondary carrier can transmit all the bits of scheduled data, then, because scheduled data is first allocated to the secondary carrier (as described above), then no scheduled data would be allocated to the primary carrier. Thus, assuming there is no non-scheduled data to be carried on the primary carrier, then the primary carrier would be unused, and accordingly the preamble is not needed on the primary carrier. Thus, if at block 624 the UE determines that the actual number of bits allowed on the secondary carrier is not less than the SG_BO, then at block 628 the UE may forgo to transmit the preamble on the primary carrier (unless, as indicated at block 612 above, the preamble is already started on the primary carrier in accordance with this carrier being allocated non-scheduled data). If yes, then at block 626 the UE may start the preamble on the primary carrier. That is, at block 624 the UE may determine to start the preamble on the primary carrier if $\text{Actual}_{bits\_allowed}<\text{SG\_BO}$.

Figure 7:
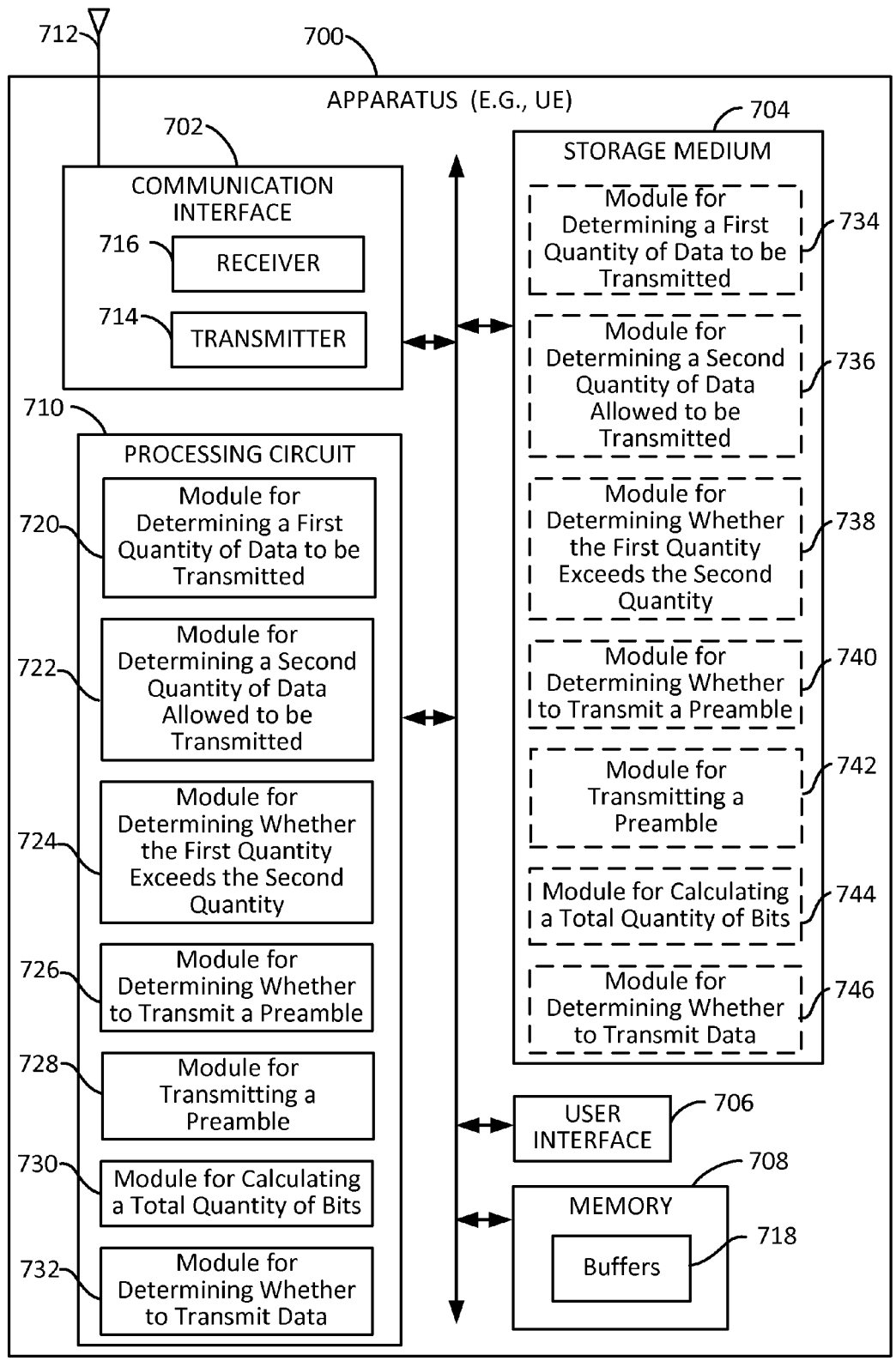
FIG. 7 is a block diagram illustrating select components of an apparatus configured to provide multi-carrier functionality in accordance with some aspects of the disclosure.

FIG. 7 is an illustration of an apparatus 700 (e.g., the UE 210) configured according to one or more aspects of the disclosure. The apparatus 700 includes a communication interface (e.g., at least one transceiver) 702, a storage medium 704, a user interface 706, a memory 708, and a processing circuit 710. These components can be coupled to and/or placed in electrical communication with one another via a signaling bus or other suitable component. In particular, each of the communication interface 702, the storage medium 704, the user interface 706, and the memory 708 are coupled to and/or in electrical communication with the processing circuit 710.

The communication interface 702 may be adapted to facilitate wireless communication of the apparatus 700. For example, the communication interface 702 may include circuitry and/or programming adapted to facilitate the communication of information bi-directionally with respect to one or more communication devices in a network. The communication interface 702 may be coupled to one or more antennas 712 for wireless communication within a wireless communication system. The communication interface 702 can be configured with one or more standalone receivers and/or transmitters, as well as one or more transceivers. In the illustrated example, the communication interface 702 includes a transmitter 714 and a receiver 716.

The memory 708 may represent one or more memory devices. As indicated, the memory 708 may maintain various buffers 718 (e.g., scheduled flow buffer and non-scheduled flow buffer) along with other information used by the apparatus 700. In some implementations, the memory 708 and the storage medium 704 are implemented as a common memory component. The memory 708 may also be used for storing data that is manipulated by the processing circuit 710 or some other component of the apparatus 700.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 710 when executing programming. The storage medium 704 may be any available media that can be accessed by a general purpose or special purpose processor, including portable or fixed storage devices, optical storage devices, and various other mediums capable of storing, containing or carrying programming.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium.

Alternatively, in some implementations, a computer-readable medium may include, by way of example, a carrier wave, a transmission line, and any other suitable medium for transmitting software and/or instructions that may be accessed and read by a computer.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Programming stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols.

The processing circuit 710 is generally adapted for processing, including the execution of such programming stored on the storage medium 704. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming. Examples of the processing circuit 710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. As used herein, the term "adapted" in relation to the processing circuit 710 may refer to the processing circuit 710 being one or more of configured, employed, implemented, and/or programmed to perform a particular process, function, operation and/or routine according to various features described herein.

According to at least one example of the apparatus 700, the processing circuit 710 may include one or more of a module for determining a first quantity of data to be transmitted 720, a module for determining a second quantity of data allowed to be transmitted 722, a module for determining whether the first quantity exceeds the second quantity 724, a module for determining whether to transmit a preamble 726, a module for transmitting a preamble 728, a module for calculating the total quantity of bits 730, or a module for determining whether to transmit data 732.

The module for determining a first quantity of data to be transmitted 720 may include circuitry and/or programming (e.g., a module for determining a first quantity of data to be transmitted 730 stored on the storage medium 704) adapted to identify a set of data to be transmitted via a first carrier, determine how much data is in the set, and generate an indication of the amount of data in the set.

The module for determining a second quantity of data allowed to be transmitted 722 may include circuitry and/or programming (e.g., a module for determining a second quantity of data allowed to be transmitted 732 stored on the storage medium 704) adapted to identify a transmit data allocation for a second carrier (e.g., as discussed above in FIG. 6), determine the size of the allocation, and generate an indication of the allocation.

The module for determining whether the first quantity exceeds the second quantity 724 may include circuitry and/or programming (e.g., a module for determining whether the first quantity exceeds the second quantity 738 stored on the storage medium 704) adapted to acquire a first quantity and a second quantity, compare the first quantity and the second quantity, and generate an indication based on the comparison.

The module for determining whether to transmit a preamble 728 may include circuitry and/or programming (e.g., a module for determining whether to transmit a preamble 740 stored on the storage medium 704) adapted to obtain the results of a comparison of a first quantity and a second quantity, determine based on results whether a preamble is to be transmitted, and generate an indication of the determination.

The module for transmitting a preamble 728 may include circuitry and/or programming (e.g., a module for transmitting a preamble 742 stored on the storage medium 704) adapted to acquire a preamble, format the preamble for transmission, and invoke transmission of the preamble.

Further, the module for calculating the total quantity of bits 730 may include circuitry and/or programming (e.g., a module for calculating the total quantity of bits 744 stored on the storage medium 704) adapted to identify at least one set of bits, calculate how many bits are in the set(s), and generate an indication of the calculated number of bits.

Also, the module for determining whether to transmit data 732 may include circuitry and/or programming (e.g., a module for determining whether to transmit data 746 stored on the storage medium 704) adapted to be invoked after transmission of a preamble is initiated, and adapted to determine based on at least one criterion whether data is to be transmitted, and generate an indication of the determination.

As mentioned above, programming stored by the storage medium 704, when executed by the processing circuit 710, causes the processing circuit 710 to perform one or more of the various functions and/or process operations described herein. For example, the storage medium 704 may include one or more of the module (e.g., operations) for determining a first quantity of data to be transmitted 734, the module for determining a second quantity of data allowed to be transmitted 736, the module for determining whether the first quantity exceeds the second quantity 738, the module for determining whether to transmit a preamble 740, the module for transmitting a preamble 742, the module for calculating the total quantity of bits 744, or the module for determining whether to transmit data 746.

Figure 8:
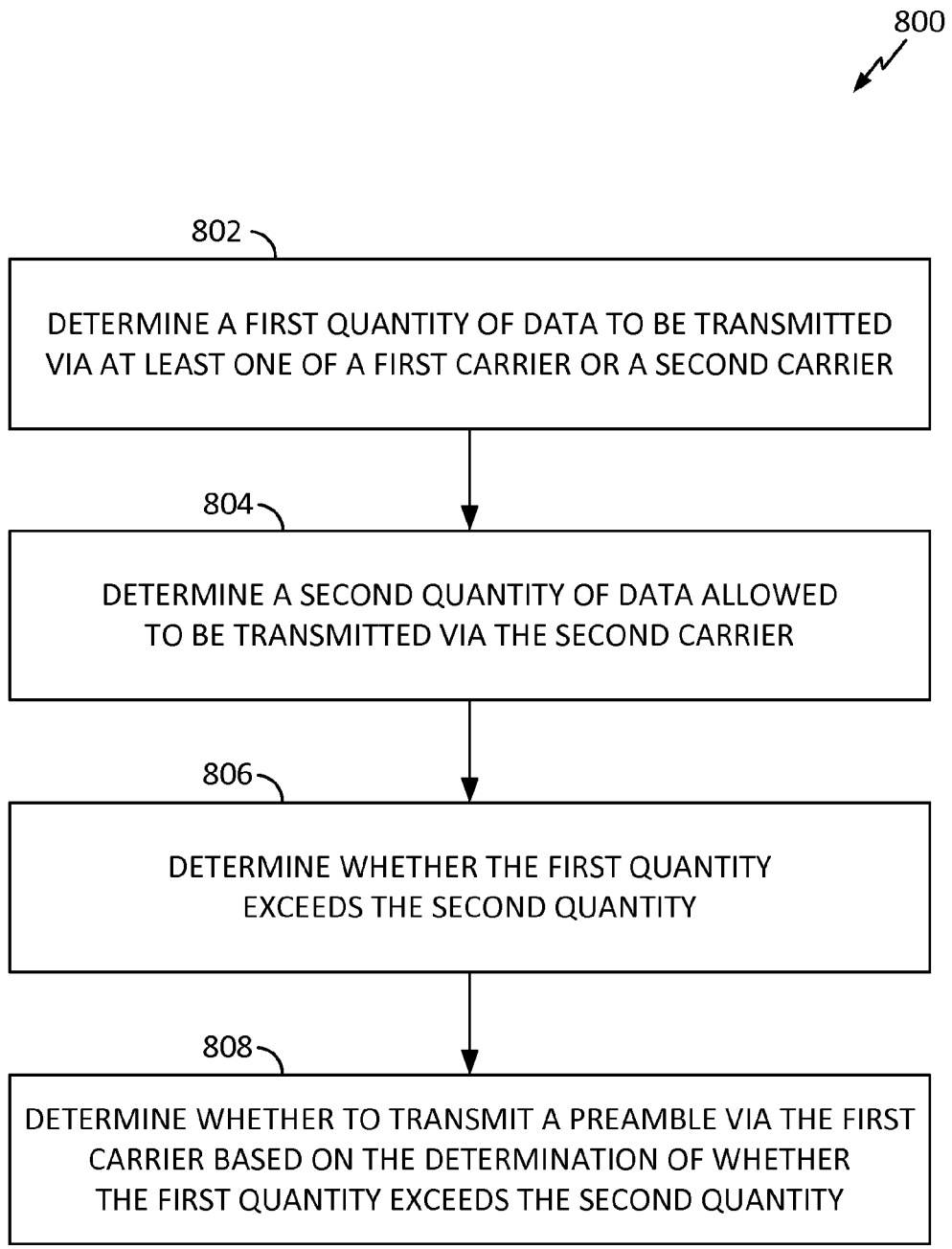
FIG. 8 is a flowchart illustrating an example of a process for selectively transmitting a preamble on a first carrier in accordance with some aspects of the disclosure.

FIG. 8 illustrates a process 800 for controlling the transmission of preambles, in accordance with some aspects of the disclosure. The process 800 may take place within a processing circuit 710 (FIG. 7), which may be located at a UE or some other suitable apparatus. In another aspect, the process 800 may be implemented by any of the UEs 130-140 illustrated in FIG. 1. Of course, in various aspects within the scope of the present disclosure, the process 800 may be implemented by any suitable apparatus capable of supporting multi-carrier operations. As discussed herein, process 800 may be operable at a UE configured for DC-HSUPA operation and CPC operation.

At block 802, a first quantity of data to be transmitted via at least one of a first carrier or a second carrier is determined. In some aspects, the first quantity of data may comprise a data buffer occupancy for scheduled flow data to be transmitted during a transmission time interval As discussed herein, the first carrier may be a DC-HSUPA primary carrier and the second carrier may be a DC-HSUPA secondary carrier. Also as discussed herein, the first carrier may be a primary carrier designated for transmission of scheduled flow data and non-scheduled flow data and the second carrier may be a secondary carrier designated for transmission of scheduled flow data but not non-scheduled flow data.

At block 804, a second quantity of data allowed to be transmitted via the second carrier is determined. In some aspects, the second quantity of data may comprise a quantity of bits allocated for transmission via the second carrier during the transmission time interval.

At block 806, a determination is made as to whether the first quantity exceeds the second quantity.

At block 808, a determination is made as to whether to transmit a preamble via the first carrier based on the determination of block 806 regarding whether the first quantity exceeds the second quantity. As discussed herein, in some implementations, the preamble is transmitted on the first carrier if the first quantity does exceed the second quantity. In some aspects, the transmission of the preamble occurs at least one time slot prior to transmission of data on the first carrier according to a CPC mode of operation.

Figure 9:
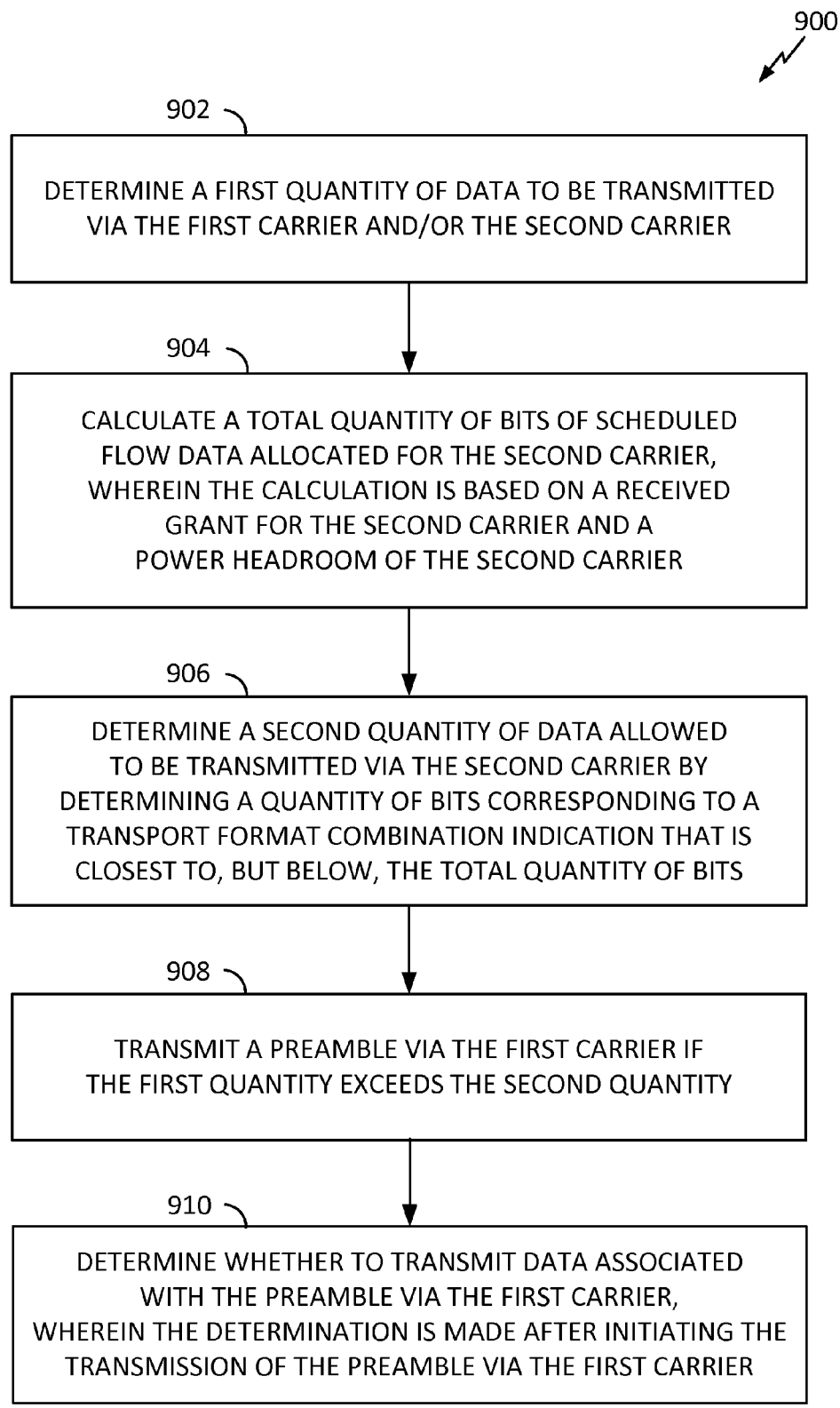
FIG. 9 is a flowchart illustrating additional aspects of selectively transmitting a preamble on a first carrier in accordance with some aspects of the disclosure.

FIG. 9 illustrates a process 900 relating to additional aspects of controlling the transmission of preambles, in accordance with some aspects of the disclosure. The process 900 may take place within a processing circuit 710 (FIG. 7), which may be located at a UE or some other suitable apparatus. In another aspect, the process 900 may be implemented by any of the UEs 130-140 illustrated in FIG. 1. Of course, in various aspects within the scope of the present disclosure, the process 900 may be implemented by any suitable apparatus capable of supporting multi-carrier operations.

At block 902, the first quantity of data to be transmitted via at least one of the first carrier (e.g., the primary carrier) or the second carrier (e.g., the secondary carrier) is determined. In some aspects, the operations of block 902 may be similar to the operations of block 802 discussed above.

At block 904, a total quantity of bits of scheduled flow data allocated for the second carrier is calculated. This calculation is based on a received scheduled grant for the second carrier and a power headroom of the second carrier.

At block 906, the second quantity of data allowed to be transmitted via the second carrier is determined by determining a quantity of bits corresponding to a transport format combination indication that is closest to, but below, the total quantity of bits calculated at block 904.

At block 908, a preamble is transmitted via the first carrier if the first quantity exceeds the second quantity. In some aspects, the operations of block 908 may be similar to the operations of blocks 806 and 808 discussed above.

At block 910, a determination is made as to whether to transmit data via the first carrier, where the data is associated with the preamble. In some implementations, this determination is made after initiating the transmission of the preamble.

Figure 10:
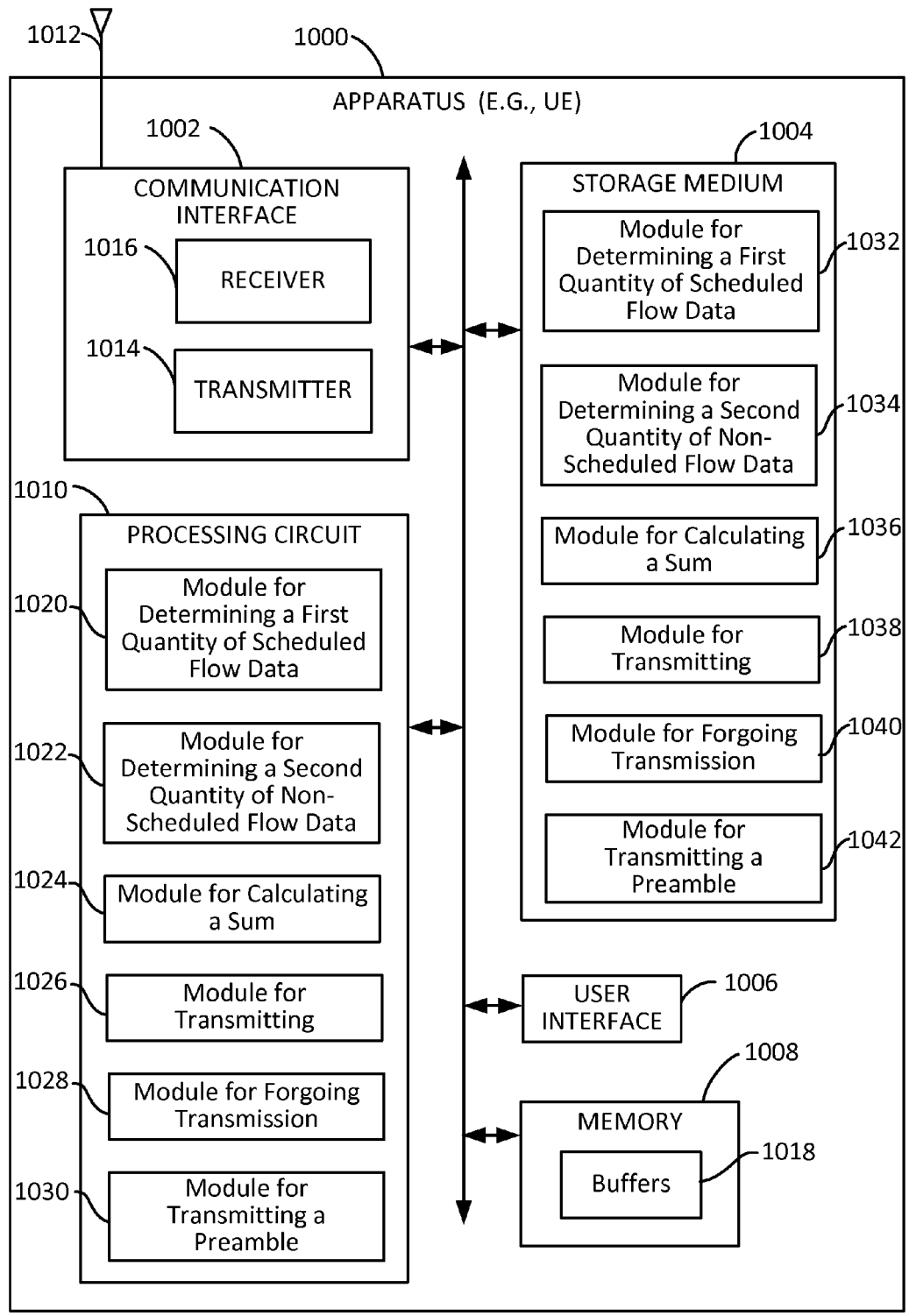
FIG. 10 is a block diagram illustrating select components of another apparatus configured to provide multi-carrier functionality in accordance with some aspects of the disclosure.

FIG. 10 is an illustration of an apparatus 1000 (e.g., the UE 210) configured according to one or more aspects of the disclosure. The apparatus 1000 includes a communication interface (e.g., at least one transceiver) 1002, a storage medium 1004, a user interface 1006, a memory 1008, and a processing circuit 1010. These components can be coupled to and/or placed in electrical communication with one another via a signaling bus or other suitable component. In particular, each of the communication interface 1002, the storage medium 1004, the user interface 1006, and the memory 1008 are coupled to and/or in electrical communication with the processing circuit 1010.

The communication interface 1002 may be adapted to facilitate wireless communication of the apparatus 1000. For example, the communication interface 1002 may include circuitry and/or programming adapted to facilitate the communication of information bi-directionally with respect to one or more communication devices in a network. The communication interface 1002 may be coupled to one or more antennas 1012 for wireless communication within a wireless communication system. The communication interface 1002 can be configured with one or more standalone receivers and/or transmitters, as well as one or more transceivers. In the illustrated example, the communication interface 1002 includes a transmitter 1014 and a receiver 1016.

The memory 1008 may represent one or more memory devices. As indicated, the memory 1008 may maintain various buffers 1018 (e.g., scheduled flow buffer and non-scheduled flow buffer) along with other information used by the apparatus 1000. In some implementations, the memory 1008 and the storage medium 1004 are implemented as a common memory component. The memory 1008 may also be used for storing data that is manipulated by the processing circuit 1010 or some other component of the apparatus 1000.

The processing circuit 1010 is arranged to obtain, process and/or send data, control data access and storage, issue commands, and control other desired operations. The processing circuit 1010 may include circuitry configured to perform a desired function and/or implement desired programming provided by appropriate media. The processing circuit 1010 may be implemented and/or configured according to any of the examples of the processing circuit 710 described above.

According to at least one example of the apparatus 1000, the processing circuit 1010 may include one or more of a module for determining a first quantity of scheduled flow data 1020, a module for determining a second quantity of non-scheduled flow data 1022, a module for calculating a sum 1024, a module for transmitting 1026, a module for forgoing transmission 1028, or a module for transmitting a preamble 1030.

The module for determining a first quantity of scheduled flow data 1020 may include circuitry and/or programming (e.g., a module for determining a first quantity of scheduled flow data 1032 stored on the storage medium 1004) adapted to identify a set of scheduled flow data to be transmitted, determine how much data is in the set, and generate an indication of the amount of data in the set.

The module for determining a second quantity of non-scheduled flow data 1022 may include circuitry and/or programming (e.g., a module for determining a second quantity of non-scheduled flow data 1034 stored on the storage medium 1004) adapted to identify a set of non-scheduled flow data to be transmitted, determine how much data is in the set, and generate an indication of the amount of data in the set.

The module for calculating a sum 1024 may include circuitry and/or programming (e.g., a module for calculating a sum 1036 stored on the storage medium 1004) adapted to acquire a first quantity and a second quantity, calculate the sum of the first quantity and the second quantity, and generate an indication of the sum.

Further, the module for transmitting 1026 may include circuitry and/or programming (e.g., a module for transmitting 1038 stored on the storage medium 1004) adapted to acquire data to be transmitted, format the data for transmission, and invoke transmission of the data.

In addition, the module for forgoing transmission 1028 may include circuitry and/or programming (e.g., a module for forgoing transmission 1040 stored on the storage medium 1004) adapted to acquire information indicative of whether a transmission is to occur, process the information to determine whether the transmission is to occur, and generate an indication as to whether to forgo transmission.

Also, the module for transmitting a preamble 1030 may include circuitry and/or programming (e.g., a module for transmitting a preamble 1042 stored on the storage medium 1004) adapted to acquire a preamble, format the preamble for transmission, and invoke transmission of the preamble.

The storage medium 1004 may represent one or more processor-readable devices for storing programming, such as processor executable code or instructions (e.g., software, firmware), electronic data, databases, or other digital information. The storage medium 1004 may be configured and/or implemented in a manner similar to the storage medium 704 described above.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where the storage medium 1004 is integral to the processing circuit 1010 and/or examples where the storage medium 1004 is separate from the processing circuit 1010.

Like the storage medium 704, the storage medium 1004 includes programming stored thereon. The programming stored by the storage medium 1004, when executed by the processing circuit 1010, causes the processing circuit 1010 to perform one or more of the various decoding functions and/or process steps described herein. For example, the storage medium 1004 may include one or more of the module (e.g., operations) for determining a first quantity of scheduled flow data 1032, the module for determining a second quantity of non-scheduled flow data 1034, the module for calculating a sum 1036, the module for transmitting 1038, the module for forgoing transmission 1040, or the module for transmitting a preamble 1042. Thus, according to one or more aspects of the present disclosure, the processing circuit 1010 is adapted to perform (in conjunction with the storage medium 1004) any or all of the decoding processes, functions, steps and/or routines for any or all of the apparatuses described herein. As used herein, the term "adapted" in relation to the processing circuit 1010 may refer to the processing circuit 1010 being one or more of configured, employed, implemented, and/or programmed (in conjunction with the storage medium 1004) to perform a particular process, function, step and/or routine according to various features described herein.

Figure 11:
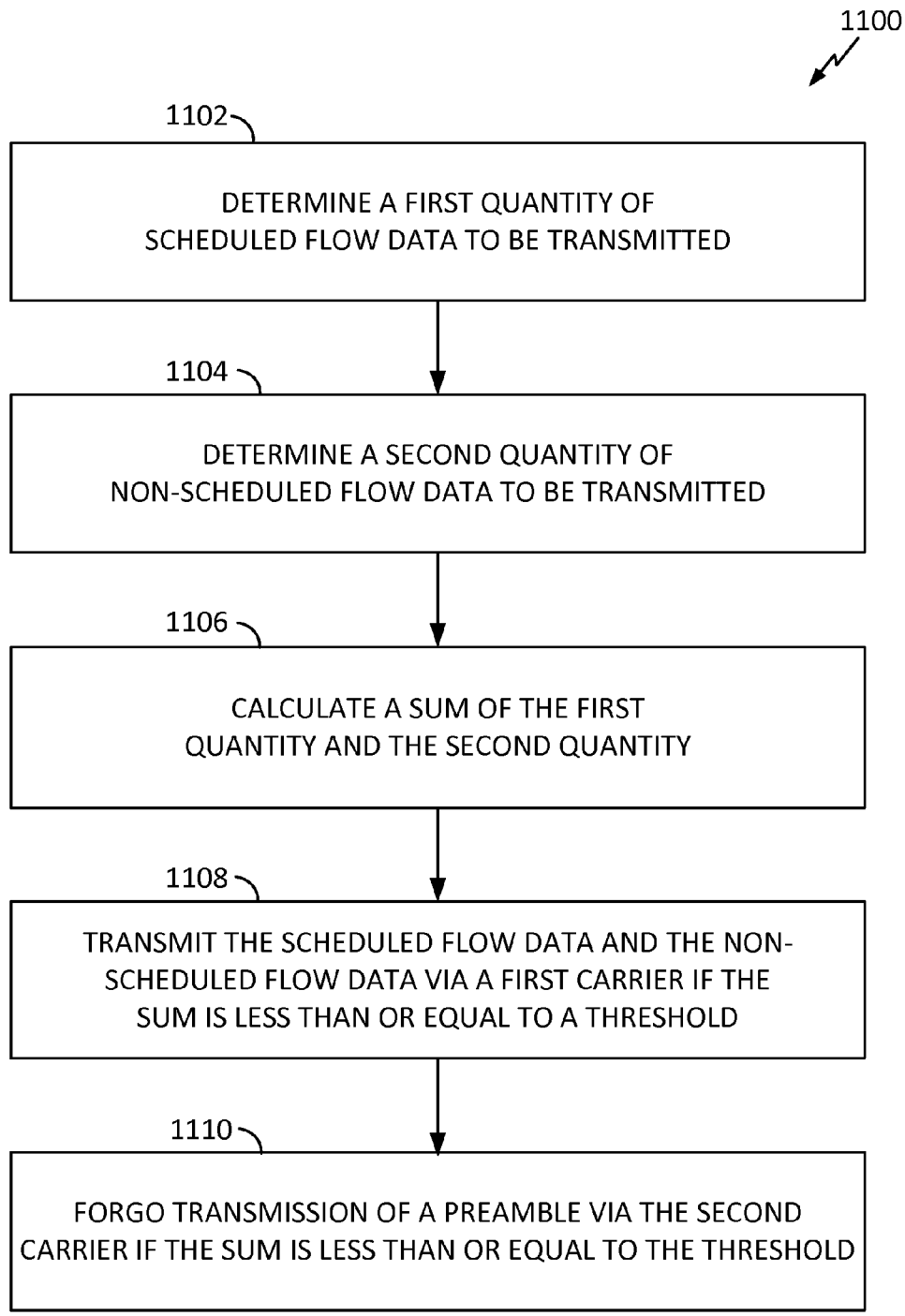
FIG. 11 is a flowchart illustrating an example of a process for selectively transmitting data on a carrier in accordance with some aspects of the disclosure.

FIG. 11 illustrates a process 1100 for controlling multi-carrier transmission, in accordance with some aspects of the disclosure. The process 1100 may take place within a processing circuit 1010 (FIG. 10), which may be located at a UE or some other suitable apparatus. In another aspect, the process 1100 may be implemented by any of the UEs 130-140 illustrated in FIG. 1. Of course, in various aspects within the scope of the present disclosure, the process 1100 may be implemented by any suitable apparatus capable of supporting multi-carrier operations. As discussed herein, process 1100 may be operable at a UE configured for DC-HSUPA operation and CPC operation.

At blocks 1102 and 1104, a first quantity of scheduled flow data to be transmitted is determined and a second quantity of non-scheduled flow data to be transmitted is determined. A sum of the first quantity and the second quantity is then calculated at block 1106. In some implementations, the data to be transmitted at block 802 of FIG. 8 corresponds to the scheduled flow data of block 1102.

At block 1108, if the sum is less than or equal to a threshold, the scheduled flow data and the non-scheduled flow data are transmitted via a first carrier and a preamble is not transmitted via a second carrier. In some aspects, the transmission of the scheduled flow data and the non-scheduled flow data may be conducted during a transmission time interval (e.g., during the same TTI). In some aspects, the threshold may comprise a quantity of bits corresponding to a transport format combination indication that is closest to, but below, a total quantity of bits of scheduled flow data allocated for the primary carrier during the transmission time interval.

As discussed herein, the first carrier may be a DC-HSUPA primary carrier and the second carrier may be a DC-HSUPA secondary carrier. Also as discussed herein, the first carrier may be a primary carrier designated for transmission of scheduled flow data and non-scheduled flow data and the second carrier may be a secondary carrier designated for transmission of scheduled flow data but not non-scheduled flow data.

Figure 12:
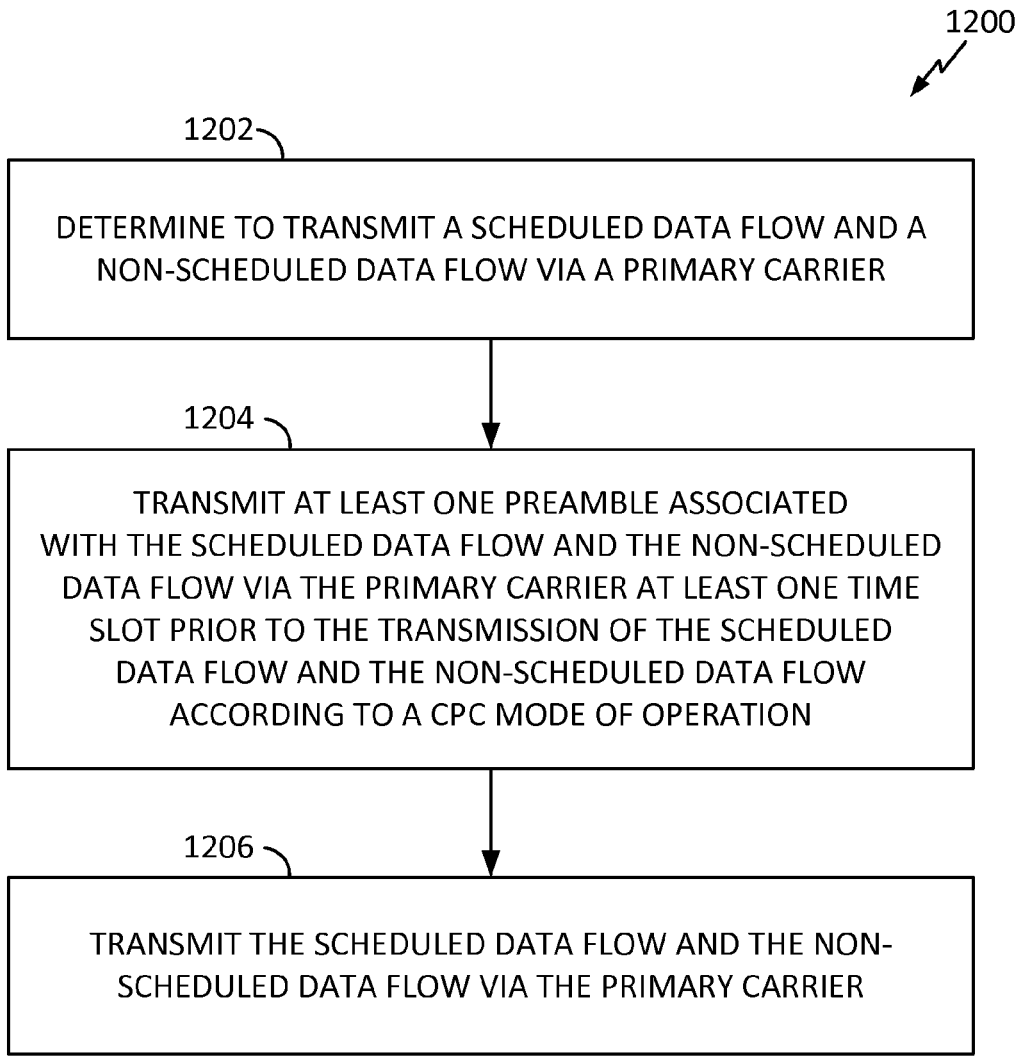
FIG. 12 is a flowchart illustrating additional aspects of selectively transmitting data on a carrier in accordance with some aspects of the disclosure.

FIG. 12 illustrates a process 1200 relating to additional aspects of controlling multi-carrier transmission, in accordance with some aspects of the disclosure. The process 1200 may take place within a processing circuit 1010 (FIG. 10), which may be located at a UE or some other suitable apparatus. In another aspect, the process 1200 may be implemented by any of the UEs 130-140 illustrated in FIG. 1. Of course, in various aspects within the scope of the present disclosure, the process 1200 may be implemented by any suitable apparatus capable of supporting multi-carrier operations.

At block 1202, a determination is made to transmit a scheduled data flow and a non-scheduled data flow via a primary carrier. Thus, in some aspects, the operations of block 1202 may be similar to at least some of the operations of blocks 1102-1108 discussed above.

At block 1204, at least one preamble associated with the scheduled flow data and the non-scheduled flow data is transmitted. The transmission of the preamble(s) occurs at least one time slot prior to the transmission of the scheduled flow data and the non-scheduled flow data (at block 1206) according to a CPC mode of operation.

Figure 13:
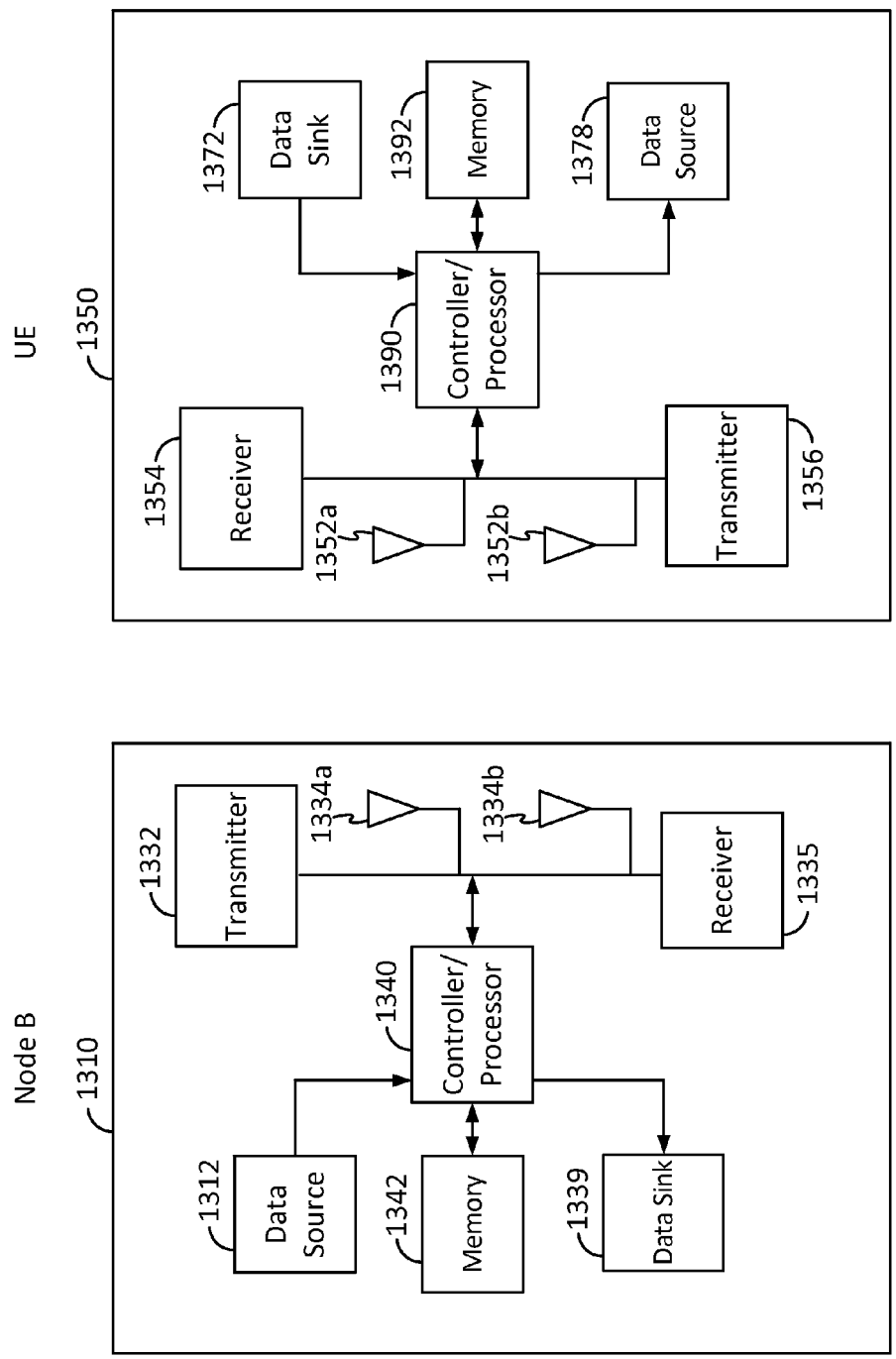
FIG. 13 is a block diagram conceptually illustrating an example of a Node B in communication with a UE in a communication system.

FIG. 13 is a block diagram of a Node B 1310 in communication with a UE 1350, where the Node B 1310 may be the Node B 208 in FIG. 2, and the UE 1350 may be the UE 210 in FIG. 2. In the downlink communication, a controller or processor 1340 may receive data from a data source 1312. Channel estimates may be used by a controller/processor 1340 to determine the coding, modulation, spreading, and/or scrambling schemes for the transmit processor 1320. These channel estimates may be derived from a reference signal transmitted by the UE 1350 or from feedback from the UE 1350. A transmitter 1332 may provide various signal conditioning functions including amplifying, filtering, and modulating frames onto a carrier for downlink transmission over a wireless medium through one or more antennas 1334. The antennas 1334 may include one or more antennas, for example, including beam steering bidirectional adaptive antenna arrays, MIMO arrays, or any other suitable transmission/reception technologies.

At the UE 1350, a receiver 1354 receives the downlink transmission through one or more antennas 1352 and processes the transmission to recover the information modulated onto the carrier. The information recovered by the receiver 1354 is provided to a controller/processor 1390. The processor 1390 descrambles and despreads the symbols, and determines the most likely signal constellation points transmitted by the Node B 1310 based on the modulation scheme. These soft decisions may be based on channel estimates computed by the processor 1390. The soft decisions are then decoded and deinterleaved to recover the data, control, and reference signals. The CRC codes are then checked to determine whether the frames were successfully decoded. The data carried by the successfully decoded frames will then be provided to a data sink 1372, which represents applications running in the UE 1350 and/or various user interfaces (e.g., display). Control signals carried by successfully decoded frames will be provided to a controller/processor 1390. When frames are unsuccessfully decoded, the controller/processor 1390 may also use an acknowledgement (ACK) and/or negative acknowledgement (NACK) protocol to support retransmission requests for those frames.

In the uplink, data from a data source 1378 and control signals from the controller/processor 1390 are provided. The data source 1378 may represent applications running in the UE 1350 and various user interfaces (e.g., keyboard). Similar to the functionality described in connection with the downlink transmission by the Node B 1310, the processor 1390 provides various signal processing functions including CRC codes, coding and interleaving to facilitate FEC, mapping to signal constellations, spreading with OVSFs, and scrambling to produce a series of symbols. Channel estimates, derived by the processor 1390 from a reference signal transmitted by the Node B 1310 or from feedback contained in a midamble transmitted by the Node B 1310, may be used to select the appropriate coding, modulation, spreading, and/or scrambling schemes. The symbols produced by the processor 1390 will be utilized to create a frame structure. The processor 1390 creates this frame structure by multiplexing the symbols with additional information, resulting in a series of frames. The frames are then provided to a transmitter 1356, which provides various signal conditioning functions including amplification, filtering, and modulating the frames onto a carrier for uplink transmission over the wireless medium through the one or more antennas 1352.

The uplink transmission is processed at the Node B 1310 in a manner similar to that described in connection with the receiver function at the UE 1350. A receiver 1335 receives the uplink transmission through the one or more antennas 1334 and processes the transmission to recover the information modulated onto the carrier. The information recovered by the receiver 1335 is provided to the processor 1340, which parses each frame. The processor 1340 performs the inverse of the processing performed by the processor 1390 in the UE 1350. The data and control signals carried by the successfully decoded frames may then be provided to a data sink 1339. If some of the frames were unsuccessfully decoded by the receive processor, the controller/processor 1340 may also use an acknowledgement (ACK) and/or negative acknowledgement (NACK) protocol to support retransmission requests for those frames.

The controller/processors 1340 and 1390 may be used to direct the operation at the Node B 1310 and the UE 1350, respectively. For example, the controller/processors 1340 and 1390 may provide various functions including timing, peripheral interfaces, voltage regulation, power management, and other control functions. The computer readable media of memories 1342 and 1392 may store data and software for the Node B 1310 and the UE 1350, respectively.

CONCLUSION

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While the above discussed aspects, arrangements, and embodiments are discussed with specific details and particularity, one or more of the components, operations, features and/or functions illustrated in one or more of FIG. 6, 8, 9, 11, or 12 may be rearranged and/or combined into a single component, operation, feature or function or embodied in several components, operations, or functions. Additional elements, components, operations, and/or functions may also be added or not utilized without departing from the teachings herein. The apparatus, devices and/or components illustrated in one or more of FIG. 1, 2, 4, 5, 7, 10, or 13 may be configured to perform or employ one or more of the methods, features, parameters, or operations described in one or more of FIG. 6, 8, 9, 11, or 12. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm operations described in connection with the embodiments disclosed herein may be implemented as hardware, software, firmware, middleware, microcode, or any combination thereof. To clearly illustrate this interchangeability, various illustrative components, blocks, modules, circuits, and operations have been described above generally in terms of their functionality. Whether such functionality is implemented as hardware or software depends upon the particular application and design constraints imposed on the overall system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A method of wireless communication by a user equipment, comprising:
   determining, by the user equipment, a first quantity of data to be transmitted via at least one of a first carrier or a second carrier;
   determining, by the user equipment, a second quantity of data allowed to be transmitted via the second carrier;
   determining, by the user equipment, whether the first quantity exceeds the second quantity;
   when the first quantity exceeds the second quantity, transmitting, by the user equipment, a preamble via the first carrier; and
   when the first quantity is less than the second quantity, forgoing transmission of the preamble via the first carrier by the user equipment.

2. The method of claim 1, wherein:
   the first carrier is a dual-carrier high-speed uplink packet access (DC-HSUPA) primary carrier; and
   the second carrier is a DC-HSUPA secondary carrier.

3. The method of claim 1, wherein the user equipment (UE) is configured for dual-carrier high-speed uplink packet access (DC-HSUPA) operation and continuous packet connectivity (CPC) operation.

4. The method of claim 1, wherein the transmission of the preamble occurs at least one time slot prior to transmission of data on the first carrier according to a continuous packet connectivity (CPC) mode of operation.

5. The method of claim 1, wherein:
   the first quantity of data comprises a data buffer occupancy for scheduled flow data to be transmitted during a transmission time interval; and
   the second quantity of data comprises a quantity of bits allocated for transmission via the second carrier during the transmission time interval.

6. The method of claim 5, wherein:
   the first carrier is a primary carrier designated for transmission of scheduled flow data and non-scheduled flow data;
   the second carrier is a secondary carrier designated for transmission of scheduled flow data but not non-scheduled flow data; and
   the determination of the second quantity of data comprises determining a quantity of bits corresponding to a transport format combination indication that is closest to, but below, a total quantity of bits of scheduled flow data allocated for the secondary carrier during the transmission time interval.

7. The method of claim 6, further comprising calculating the total quantity of bits based on a received scheduled grant for the secondary carrier and a power headroom of the secondary carrier.

8. The method of claim 1, further comprising determining whether to transmit data associated with the preamble via the first carrier, wherein the determination is made after initiating the transmission of the preamble via the first carrier.

9. The method of claim 1, wherein the data to be transmitted via at least one of the first carrier or the second carrier comprises scheduled flow data, the method further comprising:
   determining a third quantity of non-scheduled flow data to be transmitted;
   calculating a sum of the first quantity and the third quantity;
   transmitting the scheduled flow data and the non-scheduled flow data via the first carrier if the sum is less than or equal to a threshold; and
   forgoing transmission of a preamble via the second carrier if the sum is less than or equal to the threshold.

10. The method of claim 9, further comprising transmitting at least one preamble associated with the scheduled flow data and the non-scheduled flow data at least one time slot prior to the transmission of the scheduled flow data and the non-scheduled flow data according to a continuous packet connectivity (CPC) mode of operation.

11. The method of claim 9, wherein:
    the first carrier is a primary carrier designated for transmission of scheduled flow data and non-scheduled flow data; and the second carrier is a secondary carrier designated for transmission of scheduled flow data but not non-scheduled flow data.

12. The method of claim 11, wherein the transmission of the scheduled flow data and the non-scheduled flow data is conducted during a transmission time interval.

13. The method of claim 12, wherein the threshold comprises a quantity of bits corresponding to a transport format combination indication that is closest to, but below, a total quantity of bits of scheduled flow data allocated for the primary carrier during the transmission time interval.

14. An apparatus configured for wireless communication, comprising:
at least one processing circuit;
a memory coupled to the at least one processing circuit; and
a communication interface coupled to the at least one processing circuit,
wherein the at least one processing circuit is configured to:
determine a first quantity of data to be transmitted via at least one of a first carrier or a second carrier;
determine a second quantity of data allowed to be transmitted via the second carrier;
determine whether the first quantity exceeds the second quantity;
determine to transmit a preamble via the first carrier when the first quantity exceeds the second quantity; and
determine to forgo transmission of the preamble via the first carrier when the first quantity is less than the second quantity.

15. The apparatus of claim 14, wherein:
the at least one processing circuit is further configured to determine whether to transmit data associated with the preamble via the first carrier; and
the determination is made after initiating transmission of the preamble via the first carrier.

16. The apparatus of claim 14, wherein:
the first carrier is a dual-carrier high-speed uplink packet access (DC-HSUPA) primary carrier; and
the second carrier is a DC-HSUPA secondary carrier.

17. The apparatus of claim 14, wherein the apparatus comprises a user equipment (UE) configured for dual-carrier high-speed uplink packet access (DC-HSUPA) operation and continuous packet connectivity (CPC) operation.

18. The apparatus of claim 14, wherein the at least one processing circuit is further configured to transmit the preamble at least one time slot prior to transmission of data on the first carrier according to a continuous packet connectivity (CPC) mode of operation.

19. The apparatus of claim 14, wherein:
the first quantity of data comprises a data buffer occupancy for scheduled flow data to be transmitted during a transmission time interval; and
the second quantity of data comprises a quantity of bits allocated for transmission via the second carrier during the transmission time interval.

20. The apparatus of claim 19, wherein:
the first carrier is a primary carrier designated for transmission of scheduled flow data and non-scheduled flow data;
the second carrier is a secondary carrier designated for transmission of scheduled flow data but not non-scheduled flow data; and
the at least one processing circuit is further configured to determine the second quantity of data by determining a quantity of bits corresponding to a transport format combination indication that is closest to, but below, a total quantity of bits of scheduled flow data allocated for the secondary carrier during the transmission time interval.

21. The apparatus of claim 20, wherein the at least one processing circuit is further configured to calculate the total quantity of bits based on a received scheduled grant for the secondary carrier and a power headroom of the secondary carrier.

22. The apparatus of claim 14, wherein:
the data to be transmitted via at least one of the first carrier or the second carrier comprises scheduled flow data; and
the at least one processing circuit is further configured to
determine a third quantity of non-scheduled flow data to be transmitted;
calculate a sum of the first quantity and the third quantity;
transmit the scheduled flow data and the non-scheduled flow data via the first carrier if the sum is less than or equal to a threshold; and
forgo transmission of a preamble via the second carrier if the sum is less than or equal to the threshold.

23. The apparatus of claim 22, wherein the at least one processing circuit is further configured to transmit at least one preamble associated with the scheduled flow data and the non-scheduled flow data at least one time slot prior to the transmission of the scheduled flow data and the non-scheduled flow data according to a continuous packet connectivity (CPC) mode of operation.

24. The apparatus of claim 22, wherein:
the first carrier is a primary carrier designated for transmission of scheduled flow data and non-scheduled flow data; and
the second carrier is a secondary carrier designated for transmission of scheduled flow data but not non-scheduled flow data.

25. The apparatus of claim 24, wherein the at least one processing circuit is further configured to transmit the scheduled flow data and the non-scheduled flow data during a transmission time interval.

26. The apparatus of claim 25, wherein the threshold comprises a quantity of bits corresponding to a transport format combination indication that is closest to, but below, a total quantity of bits of scheduled flow data allocated for the primary carrier during the transmission time interval.

27. An apparatus configured for wireless communication, comprising:
means for determining a first quantity of data to be transmitted via at least one of a first carrier or a second carrier;
means for determining a second quantity of data allowed to be transmitted via the second carrier;
means for determining whether the first quantity exceeds the second quantity;
means for transmitting a preamble via the first carrier when the first quantity exceeds the second quantity; and
means for forgoing transmission of the preamble via the first carrier when the first quantity is less than the second quantity.

28. An article of manufacture including a non-transitory computer-readable medium having programming for causing a computer to:
determine a first quantity of data to be transmitted via at least one of a first carrier or a second carrier;

determine a second quantity of data allowed to be transmitted via the second carrier;
determine whether the first quantity exceeds the second quantity;
determine to transmit a preamble via the first carrier when the first quantity exceeds the second quantity; and
determine to forgo transmission of the preamble via the first carrier when the first quantity is less than the second quantity.

* * * * *